(12) United States Patent
Schein et al.

(10) Patent No.: US 6,412,110 B1
(45) Date of Patent: *Jun. 25, 2002

(54) ELECTRONIC PROGRAM GUIDE WITH INTERACTIVE AREAS

(75) Inventors: Steven Michael Schein, Menlo Park; Jim Leftwich, Palo Alto; David M. Folker, Fremont; Keith Hunwick, Mountain View, all of CA (US)

(73) Assignee: Starsight Telecast, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/441,645

(22) Filed: Nov. 17, 1999

Related U.S. Application Data

(63) Continuation of application No. 08/906,073, filed on Aug. 5, 1997.
(60) Provisional application No. 60/022,436, filed on Aug. 6, 1996.

(51) Int. Cl.[7] .................................................. H04N 5/445
(52) U.S. Cl. ............................ 725/40; 725/39; 725/49; 345/38
(58) Field of Search ................................. 348/906, 563, 348/564, 569, 570; 345/327, 339, 349, 351, 353, 354, 352, 145, 157, 158, 338; 725/39, 40, 49

(56) References Cited

U.S. PATENT DOCUMENTS

| 5,157,768 A | * | 10/1992 | Hoeber et al. ............... 348/601 |
| 5,287,448 A | * | 2/1994 | Nicol et al. .................. 395/159 |
| 5,436,676 A |   | 7/1995 | Pint et al. .................... 348/734 |
| 5,532,754 A | * | 7/1996 | Young et al. ................. 348/569 |
| 5,535,323 A | * | 7/1996 | Miller et al. ................. 395/155 |
| 5,559,550 A |   | 9/1996 | Mankovitz .................... 348/6 |
| 5,585,866 A |   | 12/1996 | Miller et al. ................. 348/731 |
| 5,589,892 A | * | 12/1996 | Knee et al. ................... 348/731 |
| 5,604,544 A | * | 2/1997 | Bertram ....................... 348/601 |
| 5,617,526 A |   | 4/1997 | Oran et al. ................... 395/326 |
| 5,621,456 A | * | 4/1997 | Florin et al. .................... 348/7 |
| 5,629,733 A | * | 5/1997 | Youman et al. .................. 348/7 |
| 5,675,390 A | * | 10/1997 | Schindler et al. ............ 348/552 |
| 5,724,531 A | * | 3/1998 | Miyashita et al. ........... 395/339 |
| 5,754,176 A | * | 5/1998 | Crawford ...................... 345/338 |
| 5,781,246 A | * | 7/1998 | Alten et al. .................. 348/569 |
| 5,822,123 A | * | 10/1998 | Davis et al. .................. 348/564 |
| 5,859,637 A | * | 1/1999 | Tidwell, II ................... 345/336 |
| 5,870,084 A | * | 2/1999 | Kanungo et al. ............ 345/192 |
| 6,005,570 A | * | 12/1999 | Gayraud et al. ............. 345/338 |
| 6,011,895 A | * | 1/2000 | Abecassis ..................... 386/69 |
| 6,016,146 A | * | 1/2000 | Beer et al. ................... 345/349 |
| 6,020,886 A | * | 2/2000 | Jacober et al. ............... 345/338 |

FOREIGN PATENT DOCUMENTS

WO    PCT/US94/06941    6/1994    ............ H04N/7/16

OTHER PUBLICATIONS

International Preliminary Examination Report dated Oct. 15, 1998 from the corresponding PCT application (PCT/US97/13751).

* cited by examiner

Primary Examiner—Andrew Faile
Assistant Examiner—Kieu-Oanh Bui
(74) Attorney, Agent, or Firm—Christie, Parker & Hale, LLP

(57) ABSTRACT

A television schedule system and method for displaying television schedule information on a television screen includes a program guide having a schedule information area that depicts the programs that are being presented on each channel at each time during the day. An input device allows the viewer to move a pointer over different interactive areas of the guide and the function performed when the area is activated is displayed in a contextual help window. Various control glyphs provide for recursive interaction with the guide. Additionally, a video window is interactive and provides tuning functions.

29 Claims, 36 Drawing Sheets

CHANNEL DATA TABLE

| Addr | 7 | 6 | 5 | 4 | 3 | 2 | 1 | 0 | |
|---|---|---|---|---|---|---|---|---|---|
| 0x00 | TYPE = 0x01 ||||||||  |
| 0x01 | NBR BLOCKS |||||||| |
| 0x02 | 0x00 |||||||| |
| 0x03 | NBR CHANNELS |||||||| |
| 0x04 | MSB CHANNEL ID LSB |||||||| 0x00 |
| 0x06 | DPF | ICF | NDF | /// | /// | /// | NF | TMSB | 0x02 |
| 0x07 | TUNE CHANNEL NBR |||||||| 0x03 |
| 0x08 | TRANSPONDER NBR |||||||| 0x04 |
| 0x09 | SATELLITE NBR |||||||| 0x05 |
| 0x0A | /// | /// | SOURCE || CHANNEL TYPE ||| NMSB | 0x06 |
| 0x0B | NATIVE CHANNEL NBR |||||||| 0x07 |
| 0x0C | NAME MASK BITS |||||||| 0x08 |
| 0x0D | FAVORITES LINK |||||||| 0x09 |
| 0x0E | MSB SHOWLIST HANDLE TABLE HANDLE LSB |||||||| 0x0A |
| 0x10 | MSB NAME AFFILIATION STRING LSB |||||||| 0x0C |
| 0x18 | MSB DUPLICATE CHANNELS HANDLE LSB |||||||| 0x14 |

Electronic News Service

1 Latebreaking News . . .
2 AccuWeather . . .
3 SportsUpdate . . .

Ch. 35  Lifetime
Kitchen Time
7:37pm

Click here for instant access to today's top news stories.

ELECTRONIC PROGRAM GUIDE WITH INTERACTIVE AREAS

CROSS REFERENCE TO RELATED APPLICATIONS

This application is a continuation of U.S. Ser. No. 08/906,073, filed Aug. 5, 1997 and claims the benefit of U.S. Provisional Application No. 60/022,436, filed Aug. 6, 1996.

BACKGROUND OF THE INVENTION

The present invention generally relates to television schedule information, and more particularly to a system and method for displaying a television program guide on a television screen.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased.

Additionally, television faces a digital future that will see the merger of television and PC technology. The television set of the future will include a micro-computer, a modem of interconnectivity with other computers over networks, intranets, and the internet, and be connectable to computer peripherals such as printers. Such capabilities as near "video on demand" (NVOD), "video on demand", access to the world wide web", "audio on demand", etc. will be present the viewer with a plethora of information and bandwidth.

As has become increasingly evident, information overload can actually reduce the usefulness of the information delivered. Accordingly, a great challenge exists to provide an interface that manages and provides an intelligent, user-friendly interface to the information available.

Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges. One such challenge is providing a system and method that is suitable for use on a PC, PC/TV, WebTV, or TV to manage intelligently the vast stores of information available and provide user access and control directly through an electronic program guide. Another challenge is to facilitate easy access to a wide range of functionality through the combination of a limited number of user interactions.

SUMMARY OF THE INVENTION

The present invention provides a system and method for displaying schedule information on a visual interface, such as a television screen, a computer monitor or the like. The present invention also provides a system and method for allowing the viewer to navigate and interact with a program guide that is displayed, for example, on the viewer's television screen. The program guide will usually include a schedule information area that depicts the programs that are being presented on each channel at each time during the day. With an input device, such as a remote control device, pointing device, mouse, keyboard, microphone or the like, the viewer can browse through the schedule information area and/or obtain more information about programs of particular interest.

According to one aspect of the invention, actions are directly invoked by moving a pointer over areas of the visual interface and selecting or "clicking" on the area. A "contextual help window" in the display area prompts the user as to what can be or needs to be done as the user moves the pointer over the display area. This feature insures that the user always knows what's going on.

In one aspect of the invention, a system and method is provided for allowing the viewer to utilize display action controls, configured as glyphs, to recursively vary the configuration of the display area. Each glyph is activated by a point and click action of the user input device and serves as a switch for changing between two modes.

According to one aspect of the invention, an "information glyph" switches back and forth between a title-only grid/list of many items (either a grid or listing, with one item selected) and an "information expansion" of a single item (expanding to display scrollable program or item information). The information glyph provides zoom-out for an overview or zoom-in for in-depth information.

According to another aspect, a "find others glyph" automatically searches for and displays a listing of all other airings of a currently-selected program.

According to a further aspect, a "flip glyph" flips between vertical and horizontal configurations of the display area.

According to another aspect of the invention, a "record glyph" allows for directly controlling recording with a single click.

According to another aspect of the invention, a World Wide Web (WWW) icon appears on the display when a link to a website associated with the currently-selected program exist. Clicking on the WWW icon connects the user's system to the associated website.

According to another aspect of the invention, a linked services icon appears on the display when linked services associated with the currently-selected program are available. Clicking on the linked services icon configures the user's system to access linked services.

According to another aspect of the invention, when the user moves the pointer over a video window showing a currently-tuned channel the window splits into two parts. A top part is a clickable area allowing the user to tune directly to a currently-selected program in the display area and a lower part allowing the user to return to the currently-tuned program that was being displayed before the window split.

According to another aspect of the invention, scrollable area are highlighted when the pointer is moved into the area with arrows indicating the direction of scrolling. Areas within a display area can activate scrolling of only a portion of a display area.

According to another aspect of the invention, each action is performed by a user is confirmed in a text window to reinforce the user's confidence that the action has been performed.

According to another aspect of the invention, a display mode title area displays a current display mode icon and text description when not selected and displays alternative selectable display mode icons when activated.

According to another aspect of the invention, a browsing window may be activated when a program is being viewed which may display the record glyph and world and linked-services icons.

Other features and advantages of the invention will be apparent in view of the following detailed description and the appended drawings.

BRIEF DESCRIPTION OF THE DRAWINGS

FIGS. 5A–5D are schematic diagrams of data structures in the database;

FIGS. 11–14 are representations of displays that implement the find information function;

FIGS. 15–17 are representations of displays that implement the find others function;

FIGS. 20–25 are representations of displays that implement the record function;

FIGS. 30–33 are representations of displays for interacting with the news services feature.

DESCRIPTION OF THE SPECIFIC EMBODIMENTS

Overview of the Interactive Screen

The present invention provides a schedule system and method for displaying schedule information on a visual interface, such as a television screen, computer monitor or the like. The system and method is particularly useful for use with television schedule information. The television schedule information is presented in a program guide having a schedule information area depicting the program that are being shown on each channel for a period of time, e.g., a day, week or longer.

The television schedule system includes an input device, such as a remote control device, pointing device, mouse, keyboard, microphone or the like, to allow the user to browse through the schedule information area and/or obtain more information about programs of particular interest.

The controller may comprise a trackball, cursor controller, pointing device, a microphone for allowing voice activation, a number of keys or buttons that function to move the viewer around the screen, or the like. In the preferred embodiment, the controller comprises a scrolling mechanism for displacing a movable cursor through a matrix of cells or windows on the screen. The cursor may comprise a physical icon on the screen, or it may be represented by highlighting or other visual indications of the cells or windows that are scrolled through by the viewer.

Figure 1:
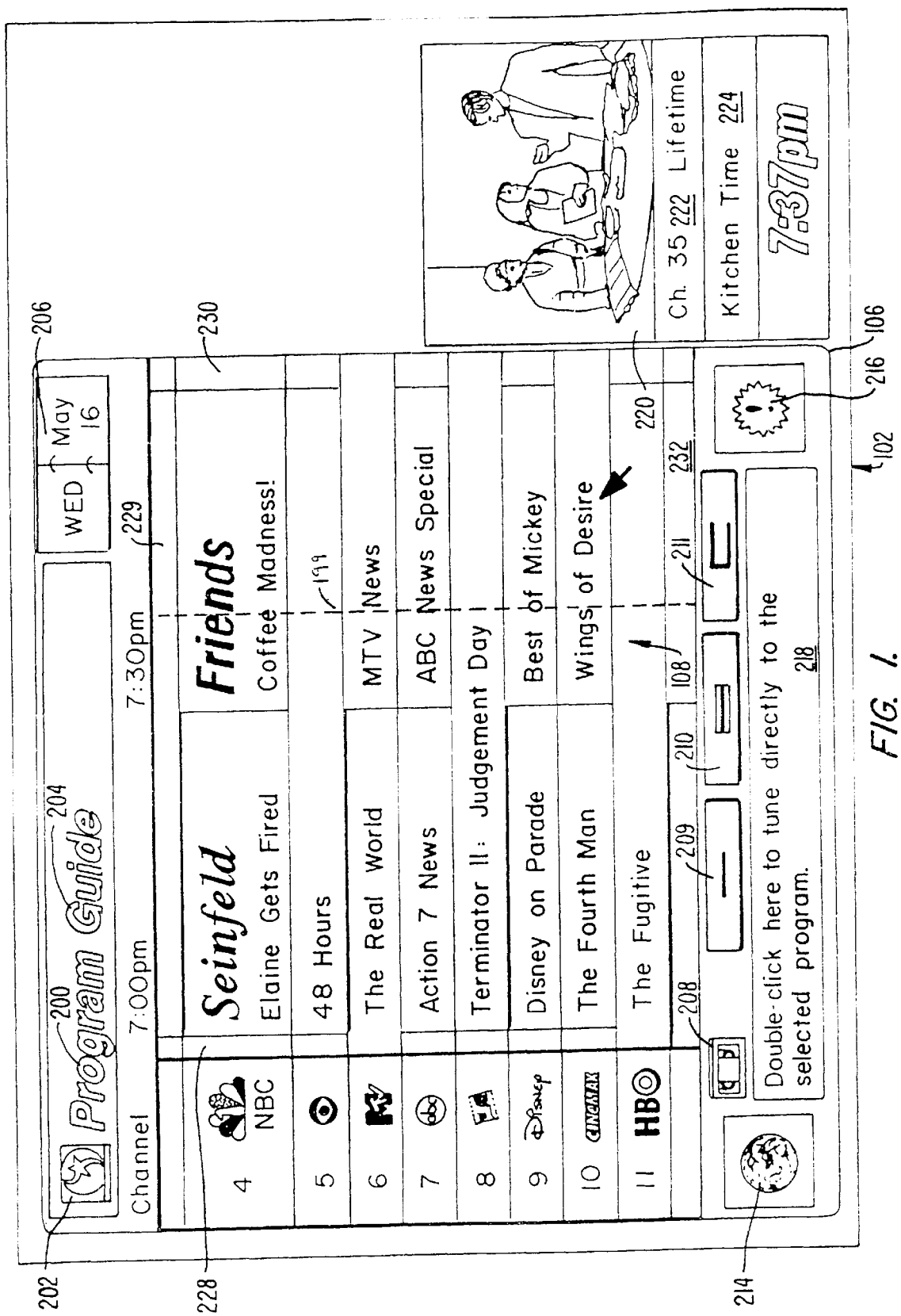
FIG. 1 is a representation of an embodiment of the EPG display of the present invention.

FIG. 1 illustrates a program guide 102 for the television schedule system of the present invention. The program guide 102, which is the primary mode in the television schedule system, includes a number of screen information areas or windows in a particular screen where the viewer operates an input device, such as a pointer device described above, to move around vertically and horizontally and to interact with that screen area's function. Preferably, the currently active screen area will be indicated to the viewer, for example, by changing the background color from a light greyscale metallic to a brighter, active color. Within each screen area are one or more items, typically arranged in a matrix or grid so that the viewer can scroll through the grid. The items can be selected or activated with the input device.

As shown in FIG. 1, program guide 102 preferably includes a schedule information area 106 having a program matrix 108 of cells or items that depict the shows that are being presented on each channel at each time during the day. Program guide 102 conveniently lists the channels in a vertical column to the left of the program matrix 108 and the times in a horizontal row above matrix 108. The viewer selects an area by moving a pointer 110 over the area associated with a desired action. When the pointer 110 is moved over an area, the item may be automatically highlighted with a brighter color to indicate the viewer's location.

In FIG. 1, program guide 102 includes a number of other information areas. For example, program guide 102 includes a display title area 200 that includes a display mode icon 202 and a display mode description text field 204. An interactive data control window 206 displays the date for the listings in display matrix 108.

Directly below the display area 108 are four small action controls 208–211 which give the viewer the ability to recursively vary the configuration of the display area 108. The operation and functions of these action controls is described in detail below. A world icon 214 may appear below the display area on the left side and a star (linked services available) icon 216 may appear directly below the display area on the right side. The operation and functions of the world star icons are described in detail below.

A contextual help window 218 is located at the bottom of the program guide 102 and displays a text field that informs the user of actions that can or need to be done when the pointer is located in a particular area of the program guide. Many examples of the different text fields that appear in the contextual help window 218 are described below.

A video window 220 may display a currently-tuned television show. Below the video window 220 is a channel window 222, a title window 224, and a current time display window 226. Each of these windows are interactive as described below. As shown in FIG. 1, the current time is represented by the location of the time line 199 with respect to the start times of the programs.

Overview an EPG System

Figure 2:
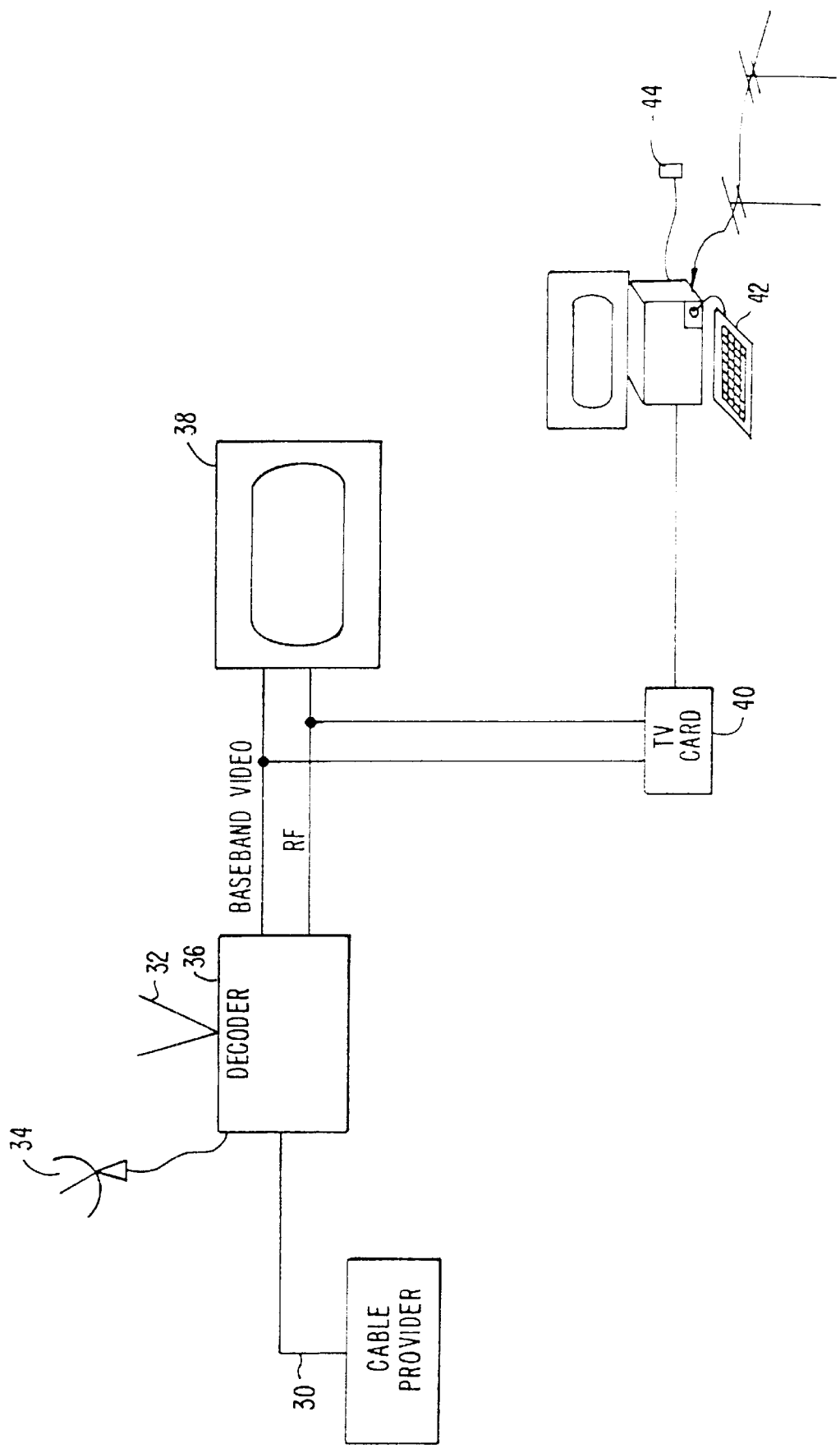
FIG. 2 is a block diagram of a TV system.

In a preferred embodiment, the electronic program guide of invention may be implemented either on a personal computer, a PCTV, a television connected to a set-top box, or a television including a custom board. However, the invention is not limited to any particular hardware configuration and will have increased utility as new combinations of computers and television systems are developed. In the following any of the above will sometimes be referred to as a "TV system". Block diagrams of representative TV systems are depicted in FIG. 2. Details of implementation are not depicted because the invention is not limited to any particular TV system.

As is well known, the picture to be displayed may be transmitted as an analog signal, for example according to the NTSC standard utilized in the United States, or as a digital signal modulated onto an analog carrier. The signals may be received over a cable, or via an antenna or satellite dish. Typically, television sets are designed to receive analog signals and computers display devices are designed to display pictures encoded in a digital format. However, decoder system converts the digital data to an analog signal for display on a television set and TV modems can format analog TV signals for display on a monitor.

In FIG. 2, analog or digital TV signals, received via cable 30, antenna 32, or satellite dish 34, are provided to a television system. If the signal is from a digital broadcast service, then a decoder 36 converts the signal to baseband video and audio or channel 3/4 RF. If the signal is an analog signal it is passed through as a video output. The television system 38, depending on its configuration, receives selected ones of the outputs and displays the received program.

A PCTV includes a TV card 40, connected to either live video, baseband video, or channel 3/4 output, digitizes the video image and displays the video image in a resizable window on the computer monitor. The PCTV is also coupled to land telephone lines by a modem 42.

If the received signal is an analog TV signal the TV card of the PCTV digitizes the analog signal and extracts included information from the vertical blanking intervals. On the other hand, if the signal is a digital signal separate audio, video, VBI (vertical blanking information such as closed caption, teletext, and program related information), program guide, and conditional access information are provided as separate bitstreams. The video and audio bitstreams for programs are converted to a format for display and the program guide information is processed to form program guide database. The processor, executing software stored in memory, generates interactive electronic program guide images and images of received programs. The guide can be used to interact with and control programs displayed in the window.

A television system configured to display an electronic program guide such as a guide provided by StarSight telecast includes an on-screen display controller and other hardware described below. If a standard analog broadcast signal is received program guide data is extracted from the VBI by a VBI data slicer and processed to form a program database. If a DBS digital signal is received, either from a satellite or cable, VBI and program data are provided in separate bit streams. The program guide images are generated are either generated locally or remotely and provided to an on screen display controller. Interactivity is provided via a remote control.

Alternatively, the program guide can be displayed on a computer monitor that interactively controls the television set through, for example, an IR interface including an IR blaster 44 to generate IR codes to control the television and/or a VCR.

If the electronic guide database is generated locally the system for creating the electronic programming guide must receive television schedule information and process the received information to create a database. Thus, the system requires, a data reception unit, a processor, memory to store program code and a database, an on-screen display generator (OSD), and a control interface for tuning to selected channels.

In one preferred embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 3:
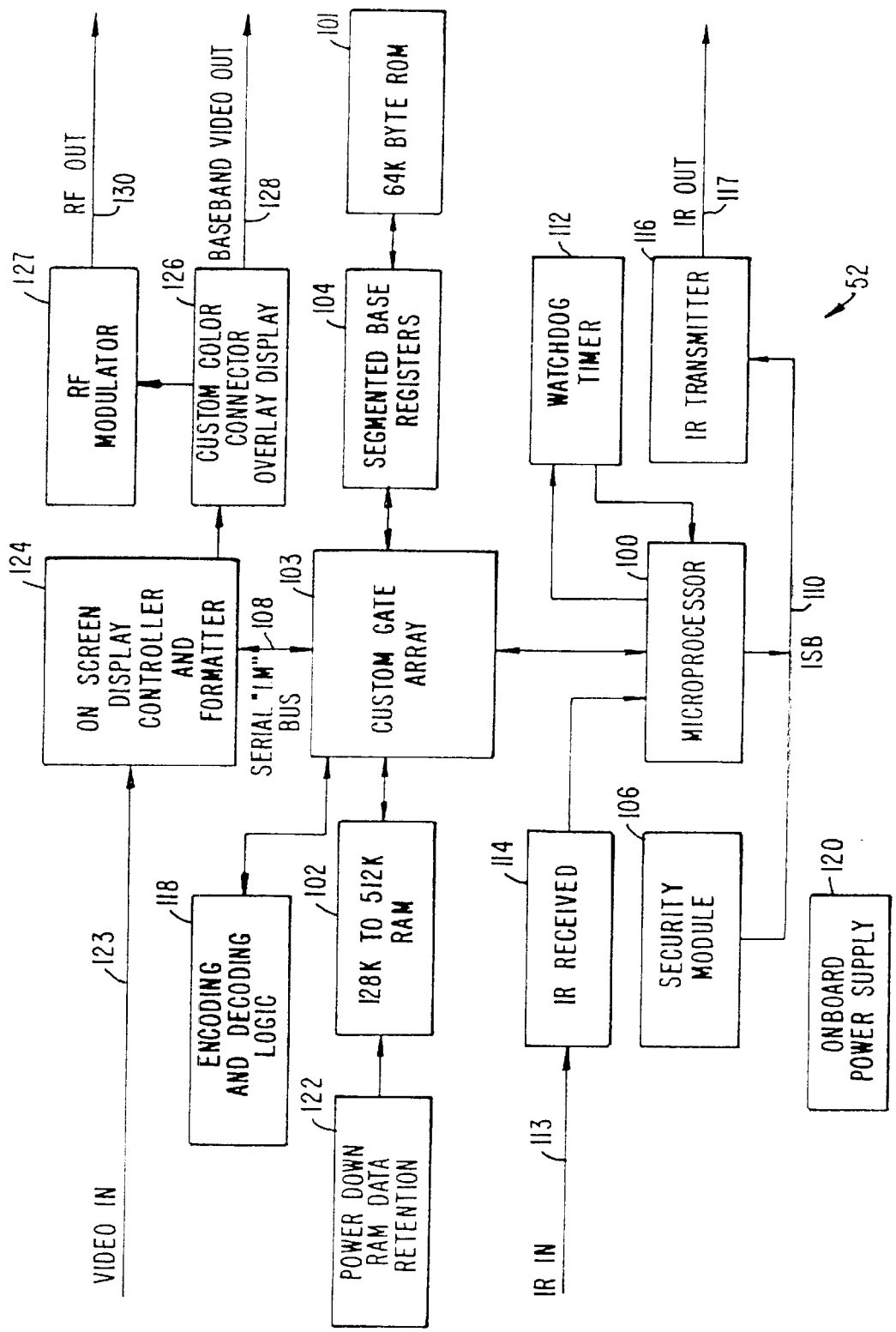
FIG. 3 is a block diagram of a hardware unit for generating an on-screen electronic programming guide (EPG)

In a preferred embodiment, a board is included at a viewer's television set and the database is stored locally and commands are transmitted in the VBIs of programming on a designated channel, for example PBS. An example of a board for receiving program guide information, generating program guide database, displaying the program guide, and interactively controlling the program guide is depicted in FIG. 3. The commands are transmitted to the board in the vertical blanking intervals of programming broadcast on a designated channel.

Alternatively, the commands could be transmitted to the local unit over land telephone lines. Additionally, as described below, is some systems the database is built remotely and the guide itself is transmitted to the local unit.

Figure 4:
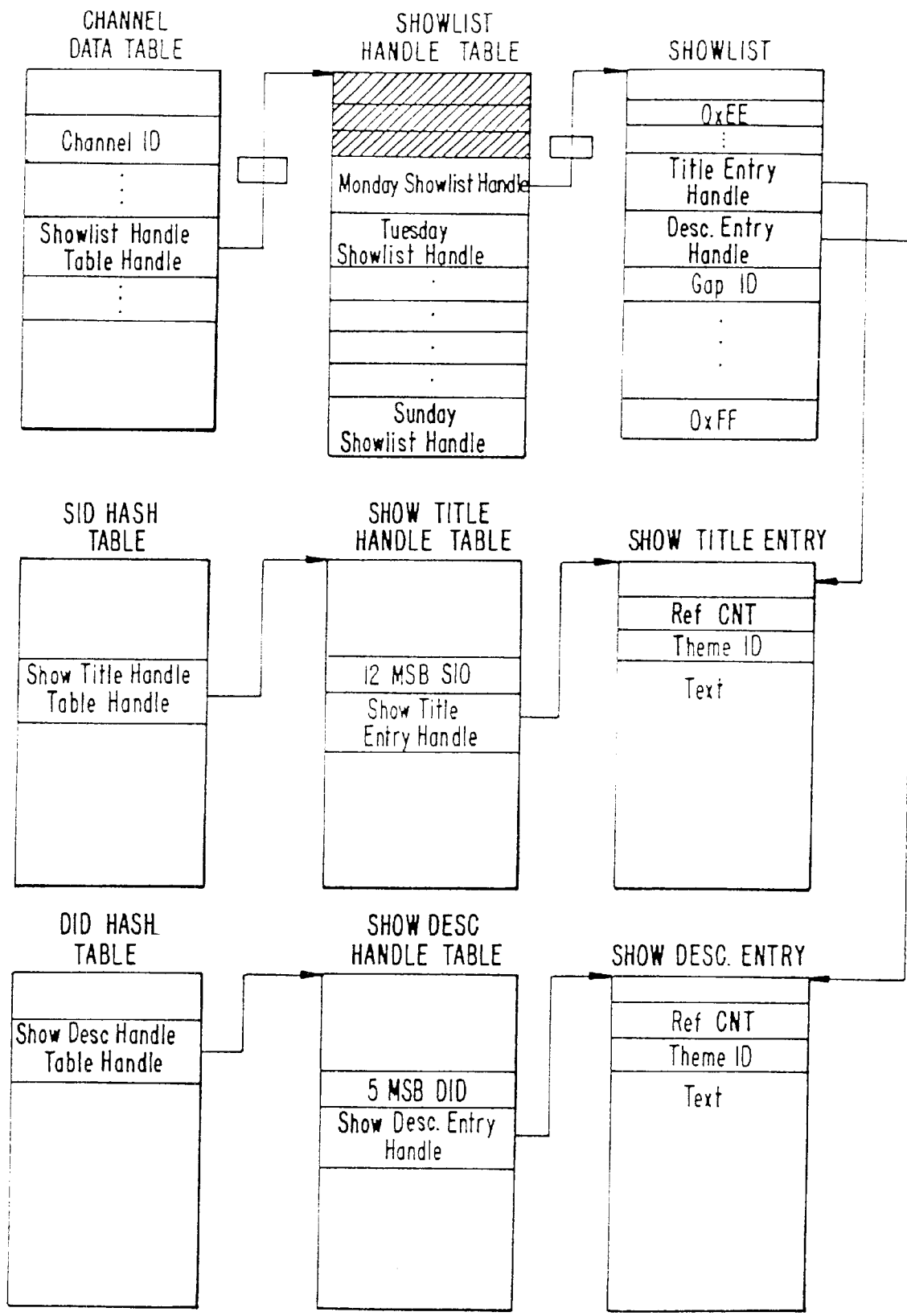
FIG. 4 is a schematic diagram of the hierarchical database utilized to generate the EPG.

The database engine builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where items of the database are stored.

In another embodiment, for example a DSS system, program guide data is transmitted as a bit stream that is processed by the database engine.

Additionally, a N.E.W.S. (new, entertainment, weather, and sports) database has been developed. Commands including story text and story IDs are transmitted. Links from the program guide to stories related to a program can be created and the related stories can be accessed from the guide.

An advertisement database is also created from commands including advertising text and logos including IDs for linking the ads to shows displayed in the EPG. The user may access the advertising information directly from the guide.

An internet database is also created from commands including URLs to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, and other information from the database. If the OSD controller operates in the character mode the display is a grid of character codes which are transferred to the OSD controller which generates the on-screen display.

An input-response user interface program module responds to user input to generate new displays responsive to the particular input. In one preferred embodiment, the user utilizes an input device, e.g., a remote control, mouse, or keyboard, to place a pointer over a part of the current display and clicks. The input-response module responds to the position of the pointer and the particular display currently displayed to generate a responsive display or take a particular action. In another preferred embodiment the user interface responds to function buttons on a remote control. Specific examples will be described below.

DETAILED DESCRIPTION OF THE EPG SYSTEM

Board Description

FIG. 3 is a block diagram an embodiment of the electronic hardware unit 52 utilized to perform the electronic on-screen schedule display and other functions. The particular hardware unit 52 depicted is for TVRO (TV Receive Only) customers having home satellite dishes for television viewing. This unit is coupled in series with existing customer TVRO equipment.

In FIG. 3, the unit receives Baseband Video in 123 from the customer TVRO system. The unit optionally outputs Baseband Video out 128 or channel 3/4 RF out 130. The unit includes an 8-bit microprocessor 100, 64 bytes of code ROM 101, 512 K of RAM 102 for program data storage, a custom gate array 103, segmented base registers 104 for fast memory data manipulation, security logic 106 for decoding incoming encrypted data, a serial bus 108 for display controller interface, serial bus 110 for inter-processor communication, watchdog timer 112 for error recovery, IR input 113, IR transmitter circuits 116 for TV, VCR control, IR output 117, CRC-32 encoding and decoding logic 118, on-board power supply 120, video input 123, On-Screen Display Controller and Formatter 124, custom color converter 126, RF modulator 127, choice of Baseband Video or RF outputs 128 or 130.

The on-screen display controller and formatter (OSDCF) 124 functions as an I/O controller, an on-screen display controller (OSD), and also as a closed-caption data (CCD) VBI data slicer. The VBI (vertical blanking interval) is a dead space in a TV signal that allows a television signal to reposition the scanning electron beam from the bottom to the top of the screen. Digital data, for example close-captioned data, is modulated onto the carrier signal during the VBI.

The OSDCF 124 includes an analog to digital convertor (ADC) which digitizes the incoming baseband video and extracts digital information transmitted in the VBIs. As explained more fully below, messages for transmission to the database are transmitted in the VBIs. These messages are transferred to the processor 100 which executes a data base engine process to build or update the database.

The OSD part of the OSDCF 124 includes cache memory, character memory, timing functions, and an external RAM. The OSD reads high level graphic commands sent from the processor 100 and stores graphic information in the RAM. The OSD outputs red (R), green (G), blue (B), graphic data which is used to generate a local video signal. Depending on the state of the user input interface, described below, the OSD local video output or the incoming live video will be displayed.

Accordingly, screen display graphic data generated by the database engine is transferred to the RAM of the OSD which the generates a local video signal that causes the display screen to be displayed on the television screen.

Scheduling Data Structures

The DBE builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where structures of the database are stored.

The hierarchy for the schedule data structures, in descending order, is:
  Channel Data Table: contains subscriber unit's list of channels;
  Show List: contains time slots for each show scheduled to be broadcast for a channel;
  Show Title: contains the title text and show title attributes;
  Show Description: contains show's ratings, attributes, and description text.

A channel data table, depicted in FIG. 5A, is the highest data structure in the hierarchy. This table includes an entry for each channel received by the subscriber unit. The entries in the channel data table are changed infrequently and are determined by the location of the subscriber unit and type of services received. Each channel data table entry includes information concerning the channel and a handle to a show list handle table for the channel.

Figure 5B:
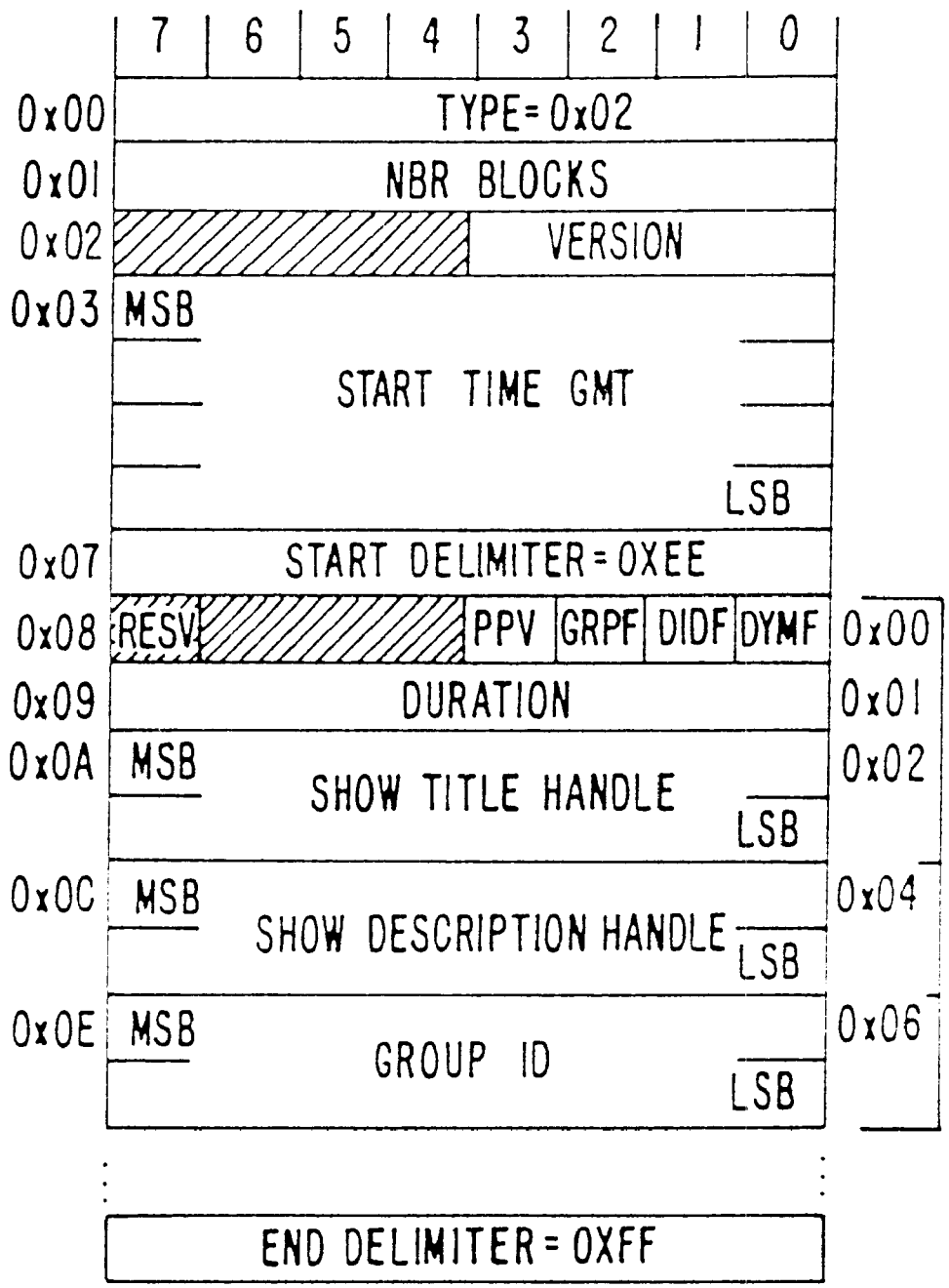

The next data structure in the hierarchy is the show list depicted in FIG. 5B. The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires the entries to be scanned, in order, from the beginning of show list and adding duration values.

The database, when fully constructed, holds a weeks worth of show lists for each channel. The days of the week are accessed by incrementing the show list handle by two bytes. The show lists are updated each day at midnight GMT with the show list for the day just completed being deleted and the show list for same day next week being added to the database.

Figure 5C:
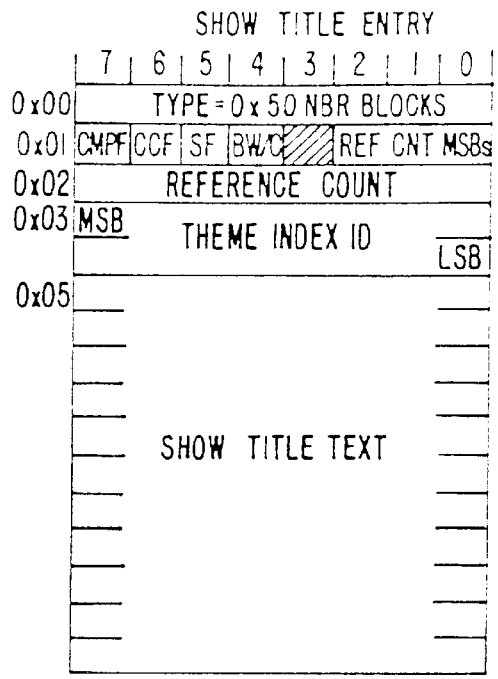
Figure 5D:
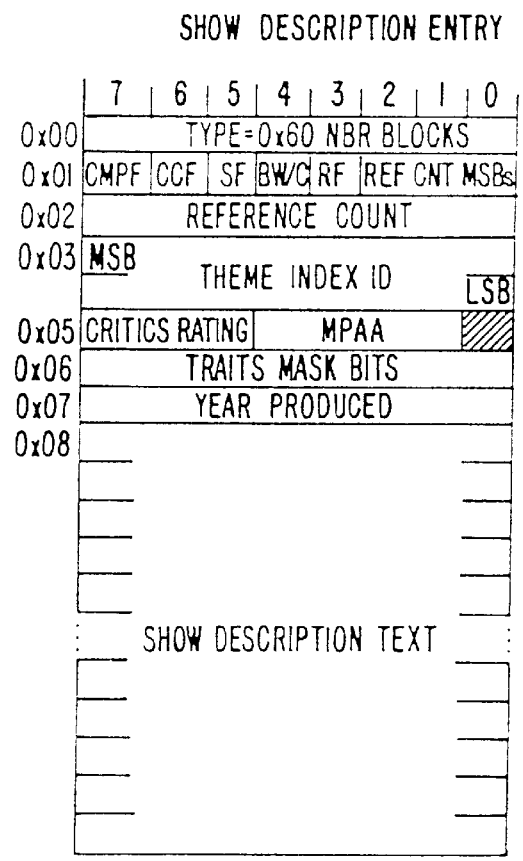

The next data structures in the schedule hierarchy are the show title entries, depicted in FIG. 5C and show description entries, depicted in FIG. 5D. For a given show slot the show title entry and show description entry are accessed utilizing the handles included in the slot. The show title and show description entries are stored in a memory pool divided into blocks. Each show title is identified by a unique 20-bit show identification number (SID) and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

Each show title entry includes theme index ID and the text of the show title. Typically, a single show title entry will be referenced by many show lists for different channels, days, and times. Thus, by utilizing handles in the show lists all show lists reference a single show title entry in memory so that memory is efficiently used. Many show title entries have a long life because the show titles may be for series that are broadcast over long periods of time and may be referenced by many showlists since many shows are broadcast by multiple channels.

Each show description entry includes a theme index ID, critics rating, MPAA rating for the show, traits mask bits, year produced, and show description text. Show description entries tend to have a shorter life than show title entries because a description is only valid for a particular episode of a series.

Schedule Search

To obtain schedule information for a particular time and to display the schedule information in the programming grid requires the following steps. For each channel in the channel list, the show list for the day is accessed and scanned. Horizontal blocks for the channel are sized according to the duration of the show slots including and following the selected time. The show title entry referenced by each show slot is accessed and the show title is displayed in the horizontal block corresponding to the show slot.

Favorite Channel Lists

Referring back to FIG. 5A, every entry in the channel data table includes a FAVORITES LINK field. This field includes a link to a next favorite channel and is utilized to form an ordered, linked list of channels in an order determined by the user.

The user interface and database engine provide screens to facilitate the ordering and selection of channels to be displayed in the guide. A link to the first channel in an ordered channel list is stored in memory. This link is utilized to access the channel table entry for the most favorite channel. The FAVORITE LINK in that channel is accessed and utilized to access the channel table entry for the next favorite channel and so on until a designated delimiter value, e.g., 0x00, indicates the end of the favorite channel list.

The capability of having more than one favorites list can be supported by having multiple FAVORITE-LINK fields stored in each channel table entry.

AD Data Structures

An ad list data structure is similar to the show list. It includes a start time and 24 hours of ad scheduling. The ad list is regionalized and includes an ad slot for each ad to be broadcast for a given day. The ad slot includes a duration and an Ad ID utilized to access an ad entry.

Each add entry includes an ad banner text field, an ad text field, and a pointer to an ad logo, if appropriate. The ad logo includes a graphics file to be displayed with the ad.

The ad entries include the ad banner text, ad text,

Help Window Data Structure

The database also includes a help string list storing ASCII help strings to be displayed in the contextual help window 218. Each help string in the list is associated with an interactive area of the EPG display. When the viewer moves the pointer over an interactive area the user interface generates a new screen displaying the associated help string displayed in the contextual help window 218.

Building the Database

The data base is built by a data base engine software module operating on the processor. Messages comprising discrete commands are received by the database engine. Examples of commands include a Region Command which specifies channels available for a particular subscriber unit to be included in the Channel Data Table; a Channel Data command including information utilized to form the entries in the Channel Data Table; and Showlist, Show Title, and Show Description commands including SIDs and DIDs referencing areas in memory. The database engine selects only Showlist Commands relevant to channels included in the Channel Table for further processing.

The data base engine creates storage locations in memory for all SIDs and DIDs included in any Showlist. Information included in commands having matching SIDs or DIDs is written to the referenced memory area. In practice the SIDs and DIDs are processed by a hashing system for more efficient searching.

The messages may be transmitted to a subscriber unit in various ways. A system for receiving messages in the VBIs of broadcast programming has been described above. In a DBS system the messages may be transmitted in a dedicated bit stream.

In a DBS system video baseband signals are digitized, compressed, and modulated onto an analog carrier signals. Because of advances in the art of compression, a carrier once used to transmit a single program can now transmit four programs. Typically, in addition to video signals other bitstreams encoding information such as audio, VBI (vertical blanking information data such as closed caption and teletext), program guide information, and conditional access information are provided as separate bitstreams, multiplexed into a composite bit stream, and modulated onto a carrier signal.

Figure 6:
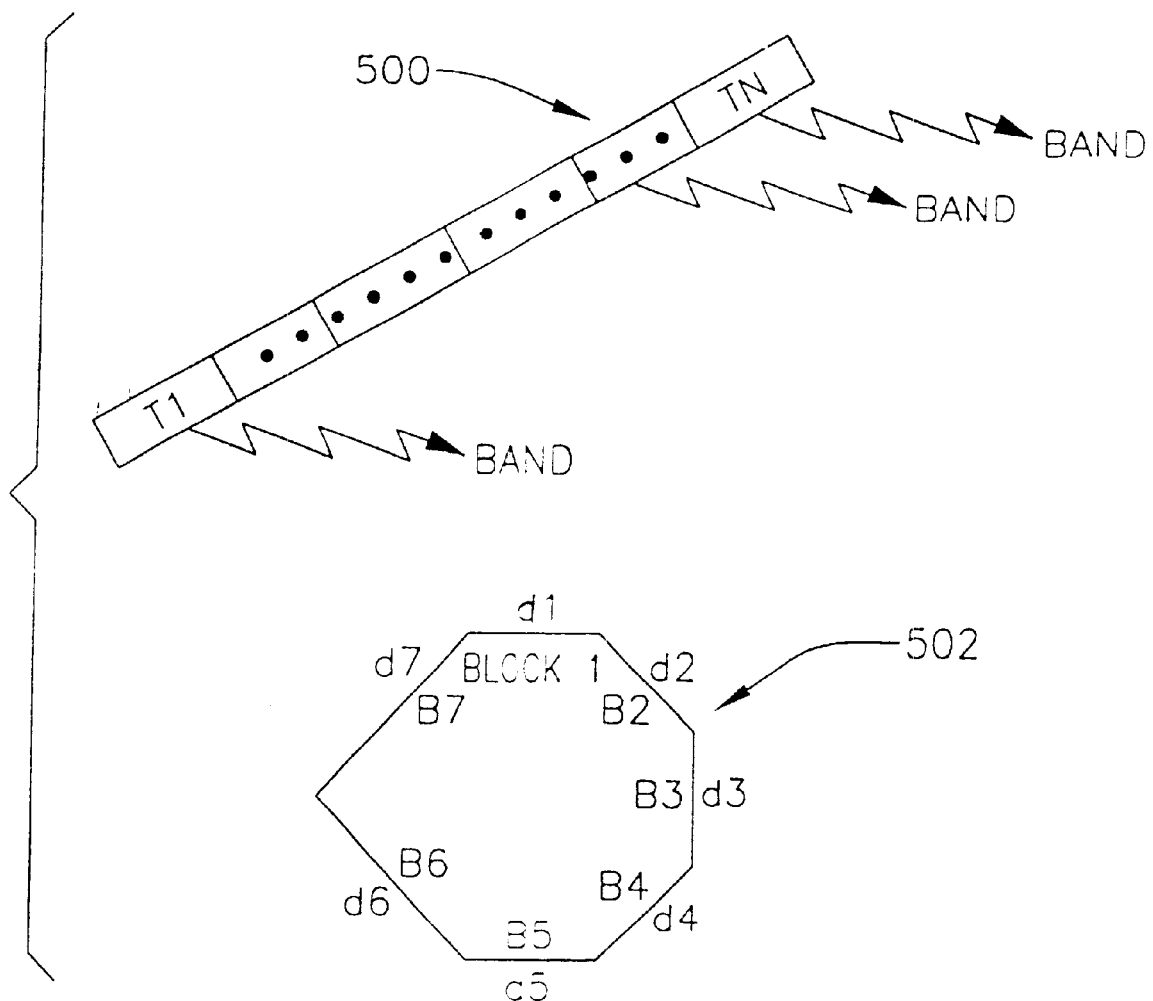
FIG. 6 is a schematic diagram depicting the transmission of an EPG in a digital satellite system.

Alternatively, the database itself may be transmitted in a digital data stream. For example, in DSS the program guide information is transmitted in block of 3 hours of programming for 36 channels. Programming is digitally modulated onto different bands. As depicted in FIG. 6, a satellite has several transponders 500 simultaneously transmitting on different bands. Several channels can be modulated onto a single band utilizing digital compression techniques. A bit stream including the current programming is carried by all bands. However, future programming for different blocks of channels is transmitted on different bands. The blocks are transmitted in as a carousel or endless loop so that there may be a delay before a particular time band is received.

A decoder at the viewers location receives 16 carriers and controls a tuner/demodulator to select one carrier. The carrier is sampled, decoded, error-corrected, and demultiplexed to separate the various bit streams. The decoder includes video decoder chips decompress compressed video to reconstruct pictures of virtually any size.

When the viewer accesses the guide the block for that time period is loaded into memory so that the user can interact with the guide. For a future time and different channel there may be a time delay. For example, if the current programming block were B1 and the block currently received is B4 the user must wait for blocks B5, B6, and B7, to be transmitted before the current programming can be received and displayed. The viewer would wait for a time delay equal to the sum of time durations for transmitting each block, i.e., d5+d6+d7. If the program guide block is modulated onto a different band the cable box must tune to the band and wait until the desired block is transmitted on the carousel. So if the guide is accessed for future programming there could be a delay.

For cable the database is built at the SST head end and sent over land-lines to the cable head end. Cable company sends data anyway it wants, VBIs, satellite, digital, etc.

User Interface

The user interface takes remote control commands as its primary input. In one embodiment a user requests various functions by pressing function buttons on a remote control. In another embodiment, the GUI is utilized with different interactive regions on a displayed screen corresponding to different functions. The user moves the cursor over the interactive region corresponding to a desired function and selects the function to generate command. The particular form of entering a command is not critical and technology for utilizing voice commands may soon be available.

The user interface receives commands and responds with a requested display screen and by performing the function requested by the command. The function performed may be to perform an action such as recording a program, tuning to a channel, accessing a related internet site, purchasing a pay-per-view program, or purchasing merchandise. The data and format of each screen is dependent on the previous screen, time of day, the contents of the data base, the command received, and other parameters. A state table is used to define the screen flow.

For every defined screen, there is an entrance function, an exit function, an update function, and an array of request-handling functions. The entrance function is called when a state is first entered to collect all necessary data and format the screen. The exit function is called to release memory and data for the screen. The update function is called once per minute to update the screen time and to re-draw the screen if any information displayed on the screen needs to be updated.

Once in a particular state, the table contains a reference to another software function corresponding to each key on the remote control or to each interactive region on the screen. These referenced functions will be executed whenever an associated remote control button is pressed or interactive region is selected.

For example, if the user wishes to record a program, in the GUI embodiment, the viewer moves the cursor over the record interactive region which is then selected to request that the recording function be performed. A confirmation screen will then be generated. Once the user confirms the recording request, an entry is made in a recording queue. A record daemon is then called from the real-time executive to examine the queue and manage recording functions.

The screens are displayed by the on-screen display (OSD) controller based on graphic display commands issued by the database engine. Among the primitive commands need to draw system display screens are the Erase Screen Command; Draw Rectangle Command; Save Rectangle Command; Restore Rectangle Command; Move Rectangle Commands; Write ASCII String Command; and Draw Channel Icon Command.

Each screen includes areas that are constant and based on code and data stored in non-volatile memory and variable areas such as show titles and descriptions which utilize data stored in the database. As described above in the description of the database engine, the database is structured to facilitate efficient searching for information, generally in the form of ASCII text strings, stored in the database. Additionally, graphics files are also being stored in the database to be displayed in windows of the display screen.

DETAILED DESCRIPTION OF PROGRAM GUIDE

Description of the Scrolling Function

Scrolling areas 228–232 allow for scrolling the contents of the display area in any direction. The operation of the scrolling areas 228–232 is described below.

Figure 7:
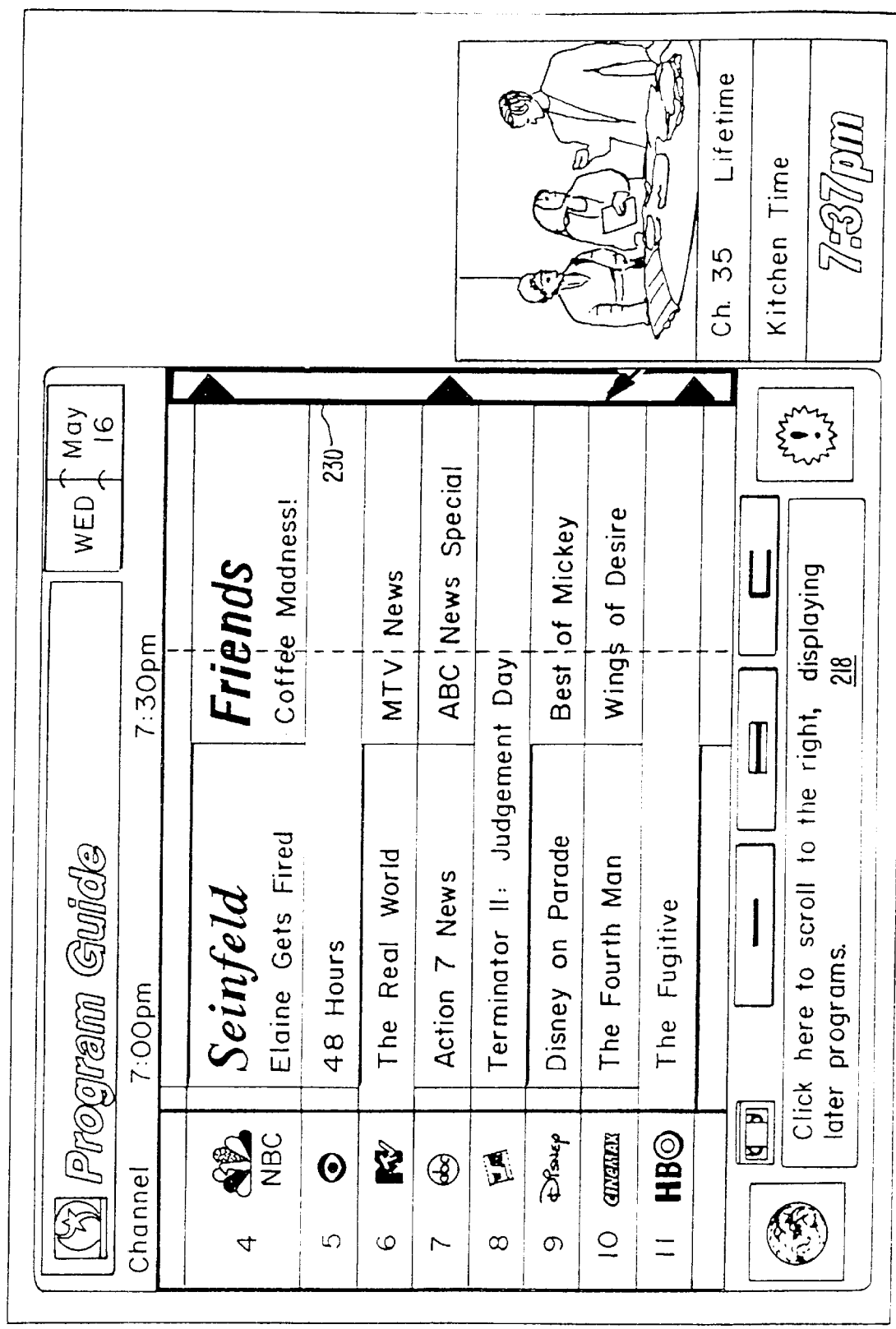
FIGS. 7–10 are representations of displays that implement the scrolling function.

Referring to FIG. 7, when the user moves the pointer over the scroll right zone 230 the zone highlights in bright green with arrows indicating the scrolling direction. The text displayed in the contextual help window 218 informs the user that clicking will scroll the display to the right to display later programs. Each click scrolls the display one half-hour. A click-and-hold scrolls a half-hour every half-second, accelerating over time as the user continues to hold, coming to a stop upon letting up.

Figure 8:
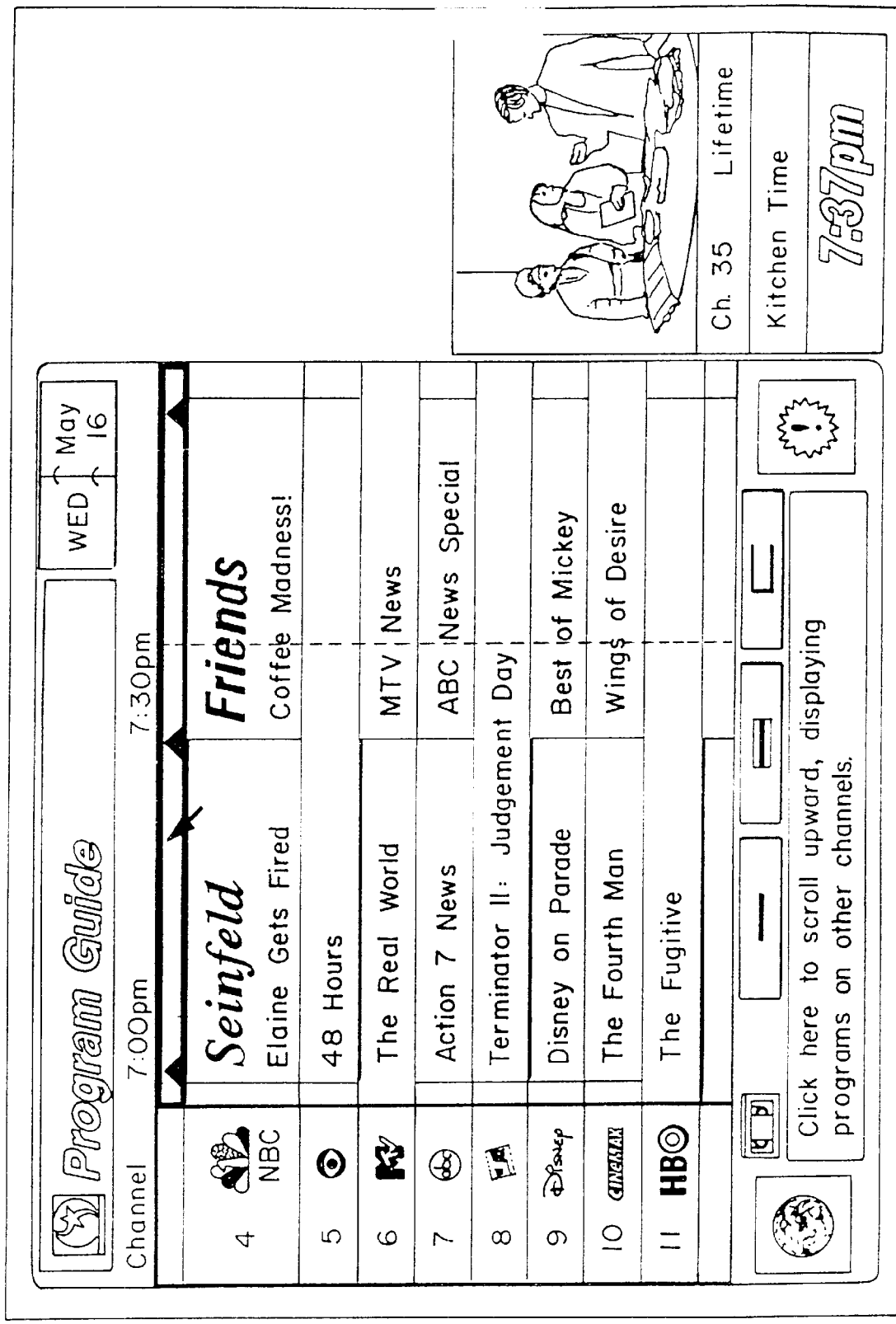
Figure 9:
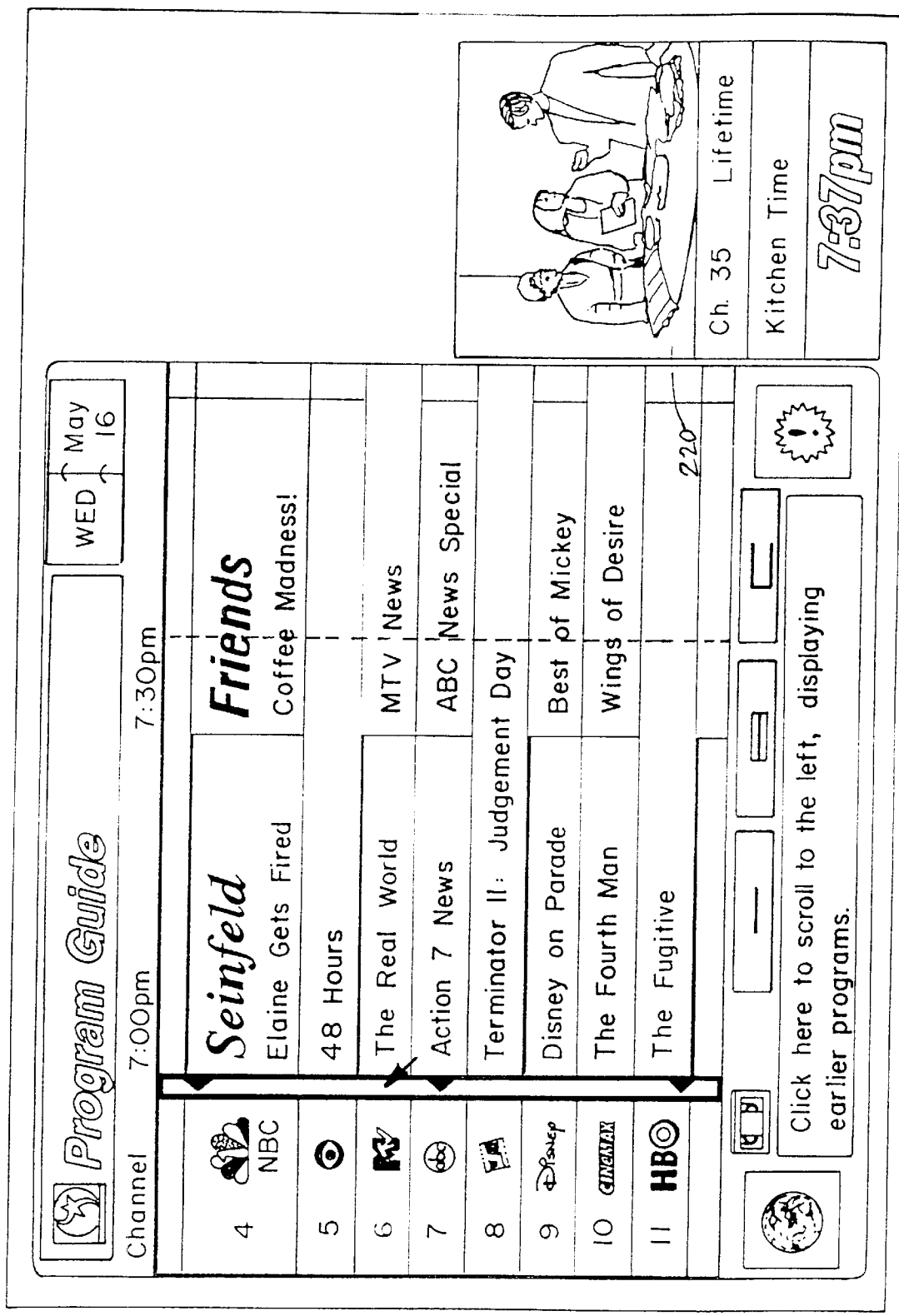
Figure 10:
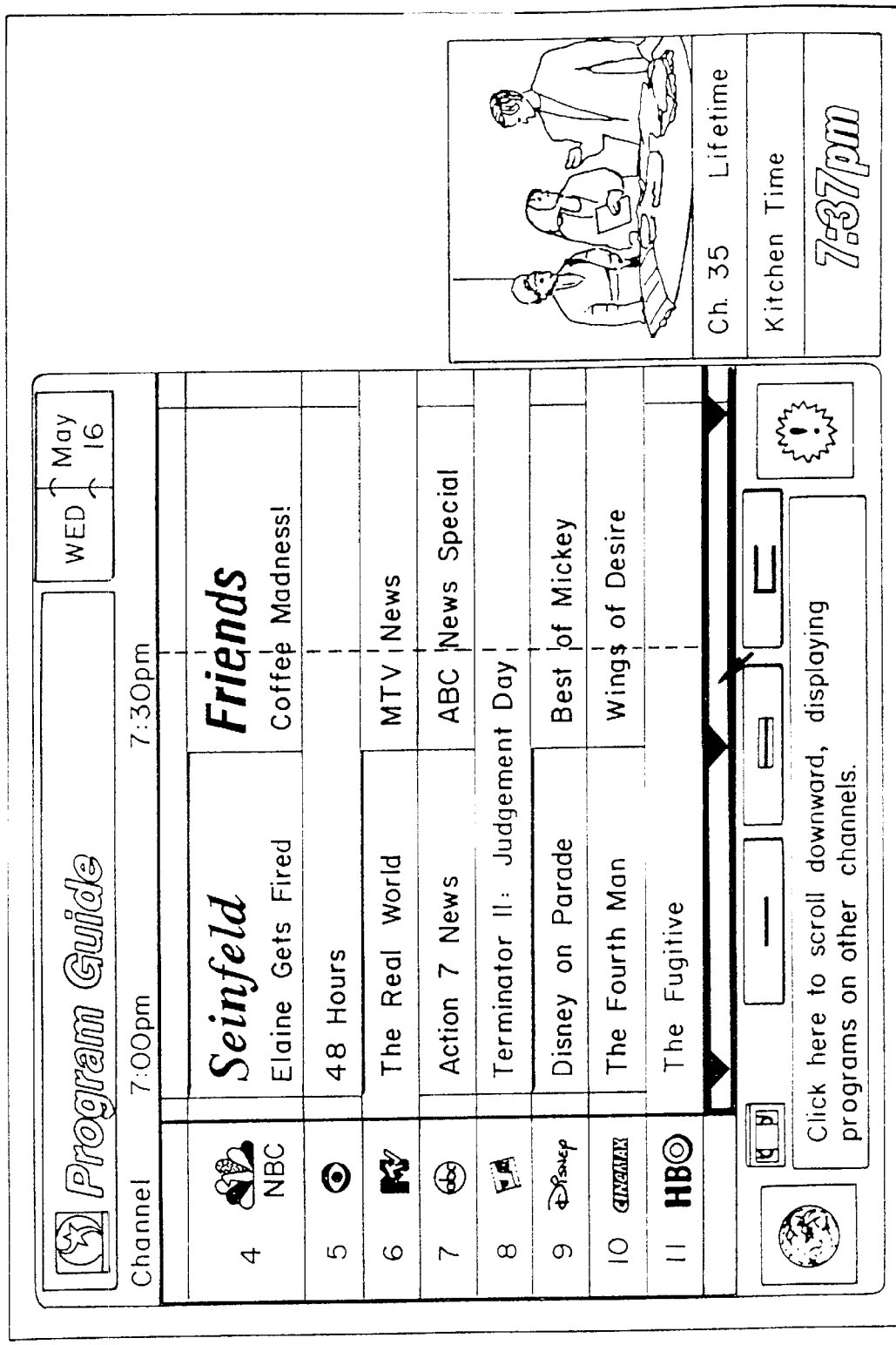

FIGS. 8, 9, and 10 depict scroll up, scroll left, and scroll down operations respectively. For the scroll up and scroll down operations each click displays the next complete vertical screen. A click-and-hold displays a new vertical screen every half-second, accelerating over time.

The operation and functions of the various action controls 208–211 will now be described.

Description of Information Glyph

Figure 11:
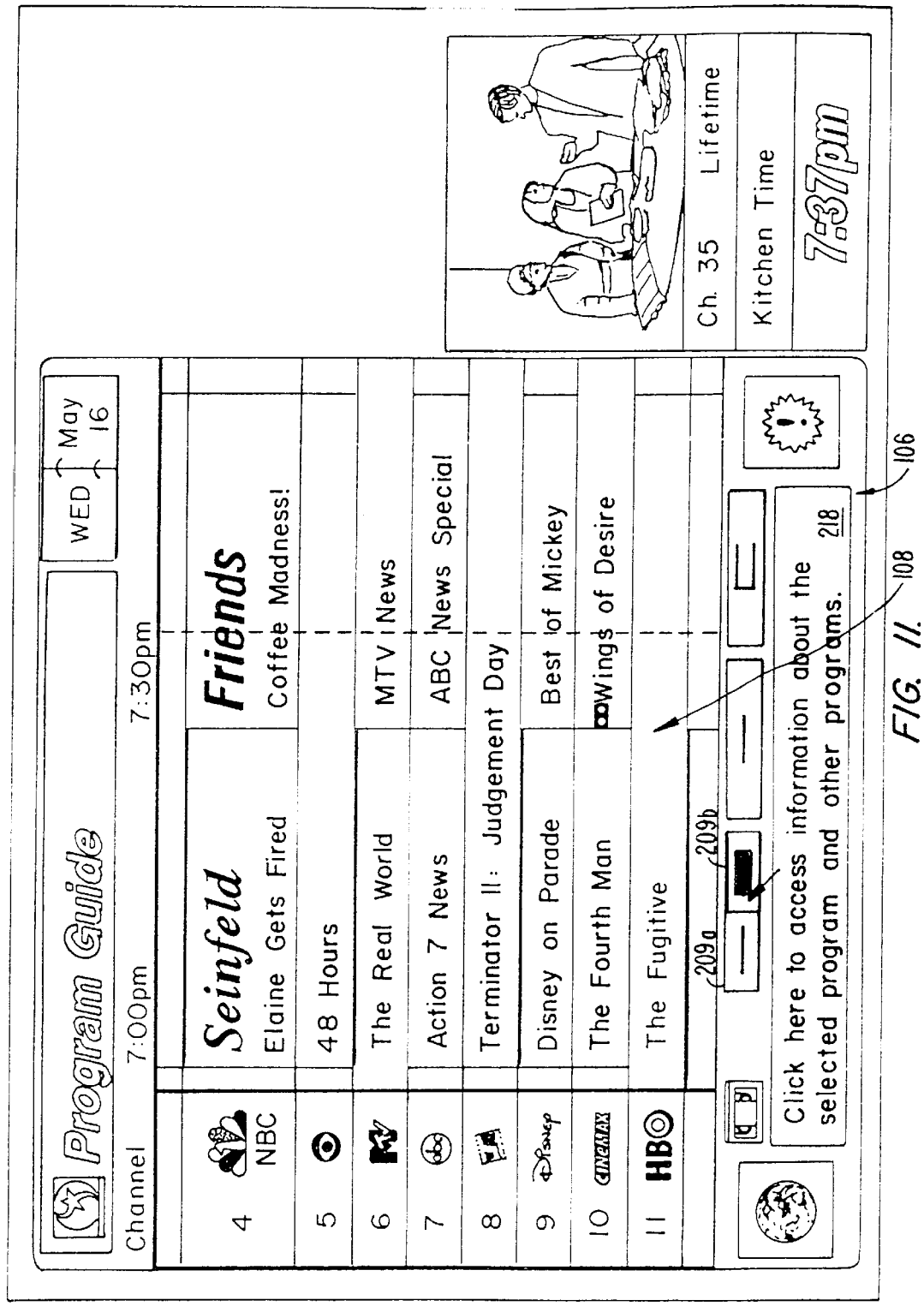

Referring to FIG. 11, after selecting an item in the program display, when a user moves the pointer from the currently selected program and places the pointer over the information glyph 209 the glyph immediately splits into a two part recursive control button. The left button 209a symbolically suggest zooming-back on the selected item to obtain necessary information included in a cell and right button 209b symbolically suggests zooming-in on a particular item to see in depth information concerning a selected program. Note that the text in the contextual help window 218 tells the user what action to take and the results of the action.

Figure 12:
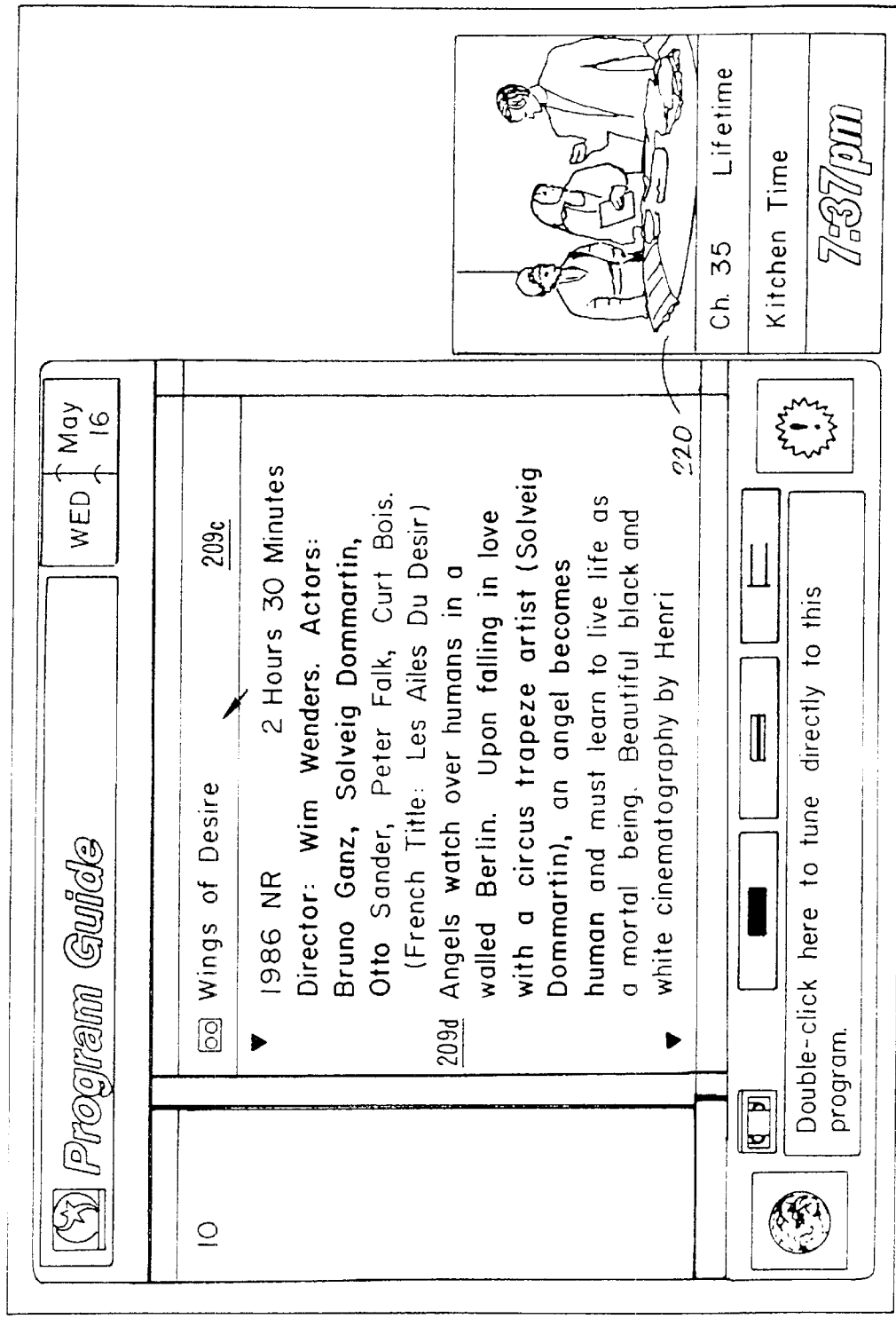

Referring to FIG. 12, as soon as the user completes the click on the zoom-in glyph 209b, a transitional animation (described below) occurs and the currently selected program item moves to a top window 209c and information about that program stretches downward in a central window 209d. The user interface directs the database engine to display program description text in the central window 209d. Both elements stretch horizontally to occupy the entire display area leaving only scroll zones around the periphery. The user may now scroll around the guide in the same manner as described above. The text in the contextual help window 218 informs the user that double clicking in the area where the pointer is located will tune directly to the program.

Figure 13:
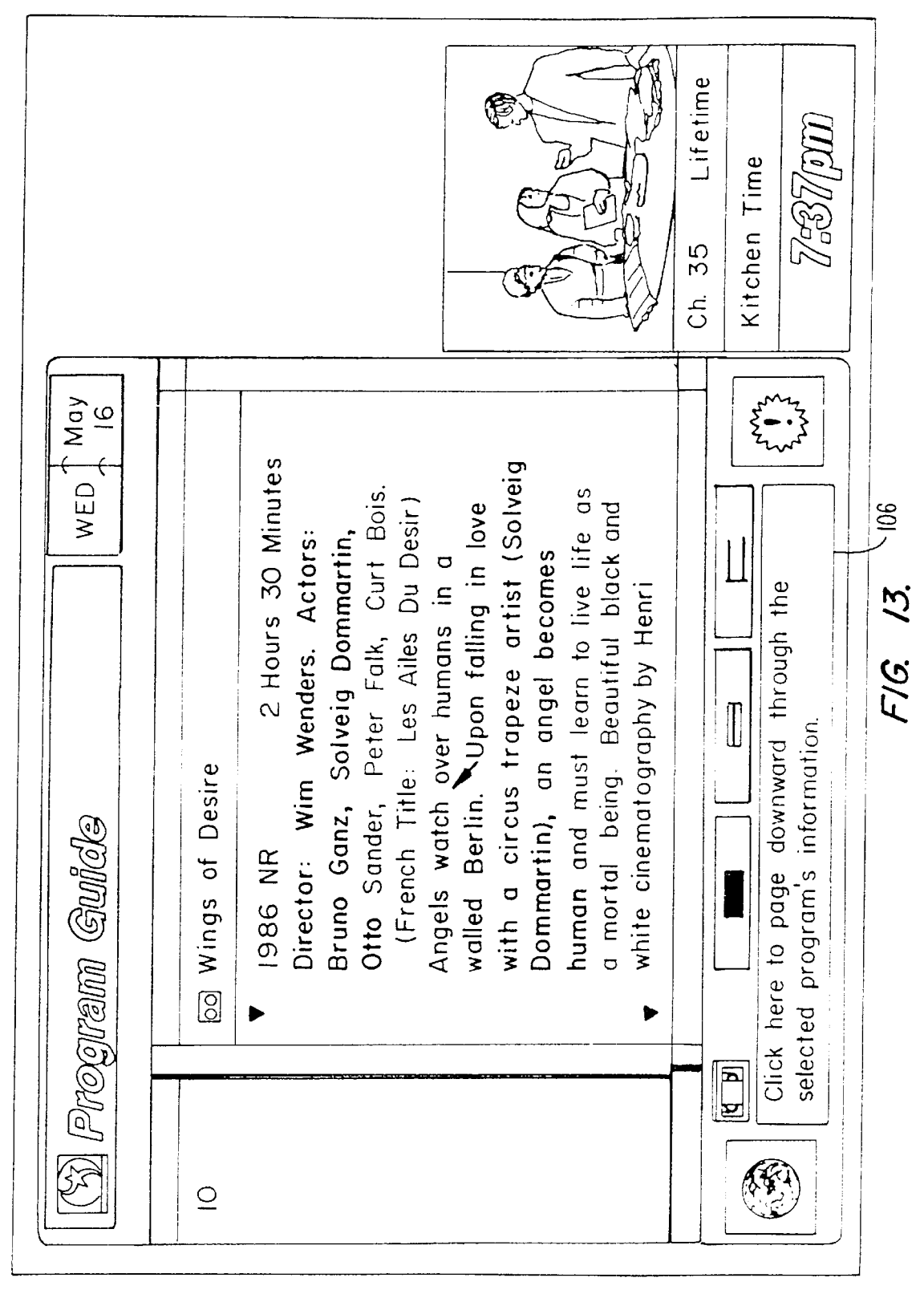

Referring to FIG. 13, when the user moves the pointer over the text area the text in the contextual help window informs the user that clicking in this area scrolls down the text. An information scroll indication zone at the left of the text displays a highlighted area in which tow arrows point downward in the direction of scrolling.

Figure 14:
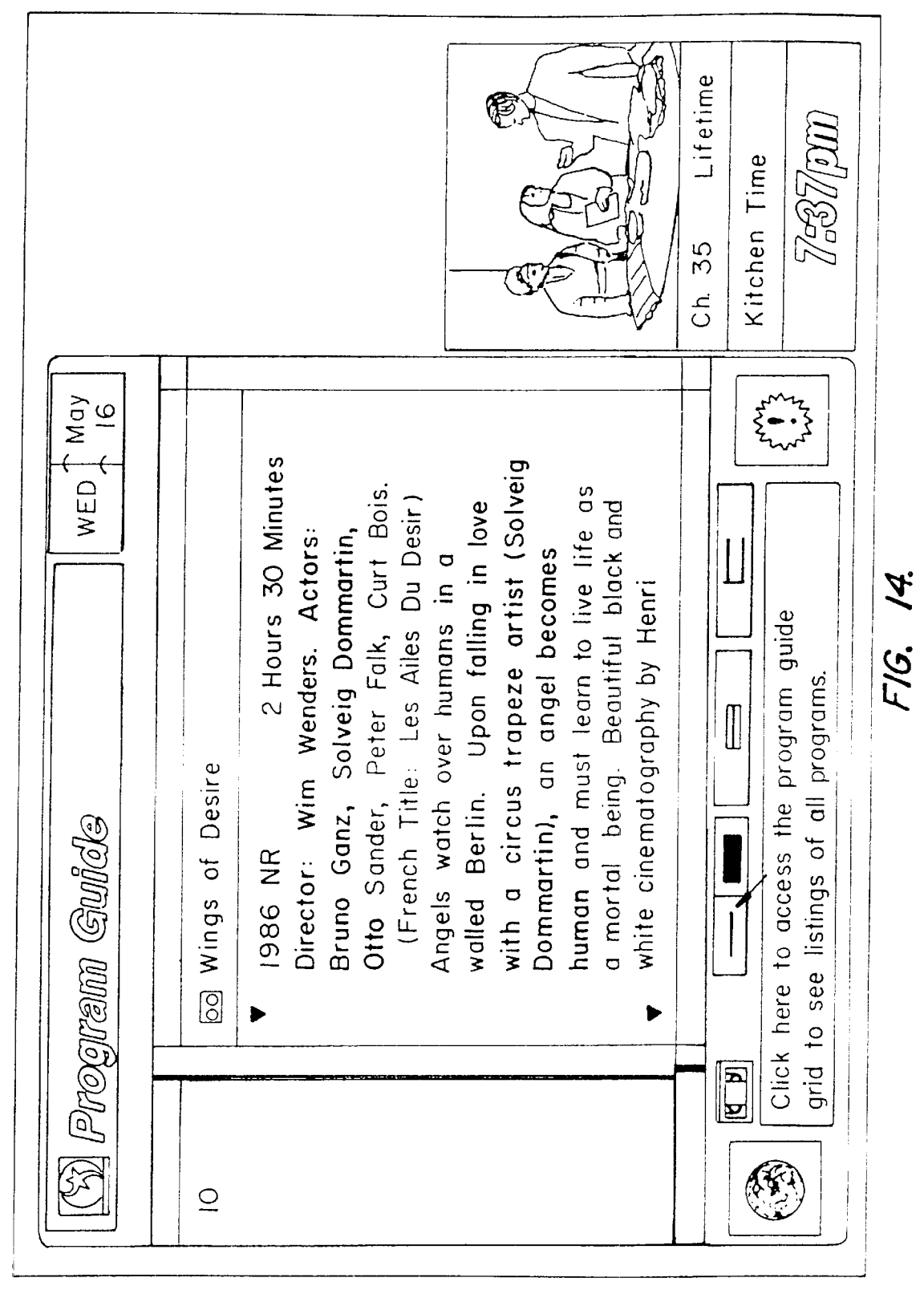

Referring to FIG. 14, the user has moved the pointer over the information glyph 209 which again splits showing the two different zoom configurations. The currently selected button 209b is highlighted. The pointer is over the left button 209a and the text in the contextual help window 218 informs the user that a click will access the program guide.

Description of Find Others Glyph

Figure 15:
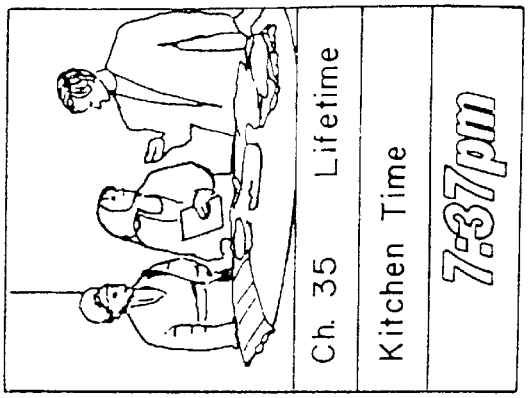

Referring to FIG. 15, after selecting a program, when the user moves the pointer over the find others glyph 210 the glyph immediately splits into a two part recursive control button. The left button 210a symbolically suggests the selected program included in program display and right button 210b symbolically suggests a multiple listing of the selected program. Note that the text in the contextual help window 218 informs the user what action to take and the results of the action.

Figure 16:
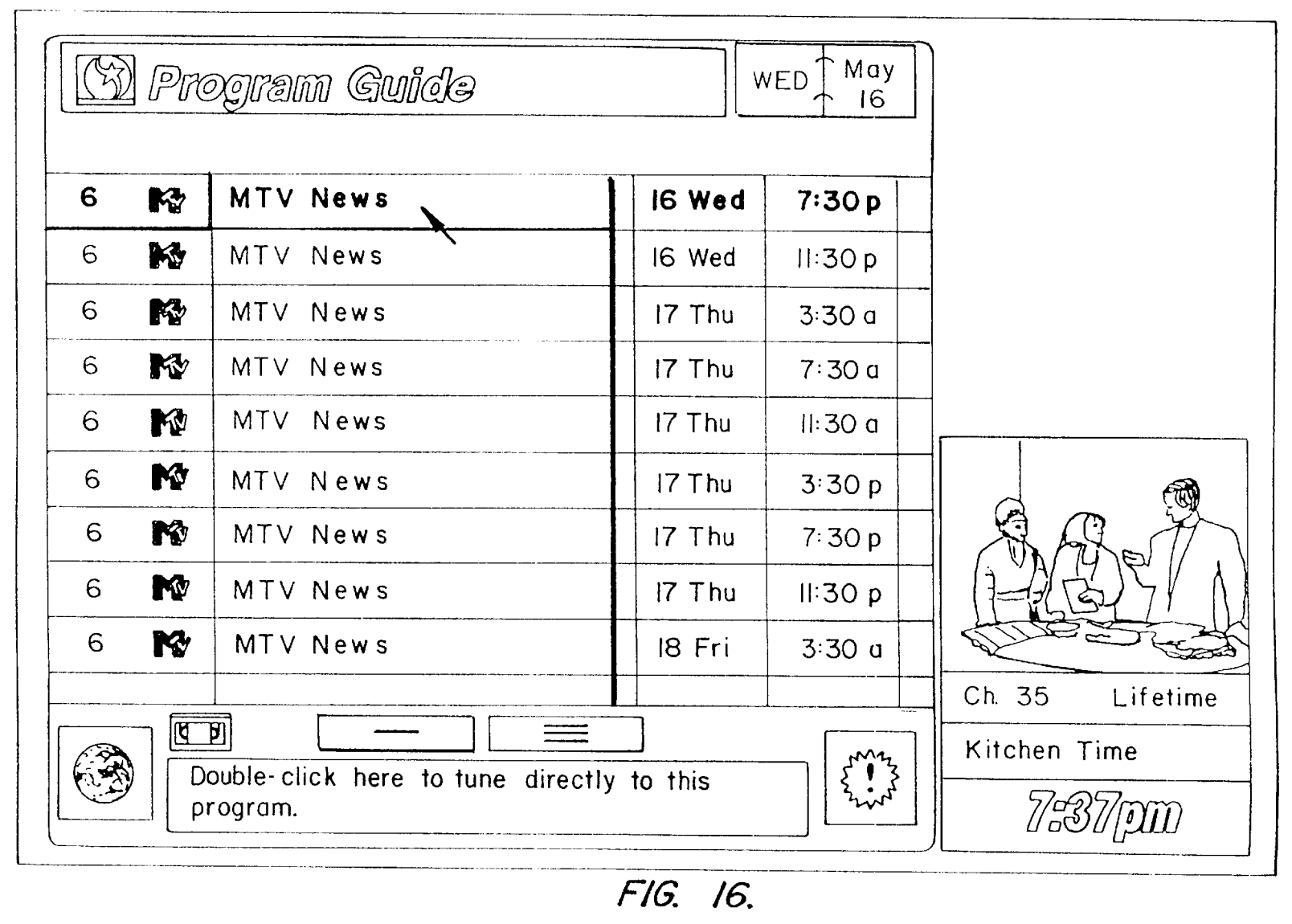

Referring to FIG. 16, after clicking on the multiple-listing glyph 210b the system displays a listing of all occurrences of the selected program in chronological order. The currently selected program is automatically selected. If the currently selected program had been for a date in the future it would appear in the middle of the list with programs occurring previously listed above it. Note that the text in the contextual help window informs the user that double-clicking will tune directly to this program.

Figure 17:
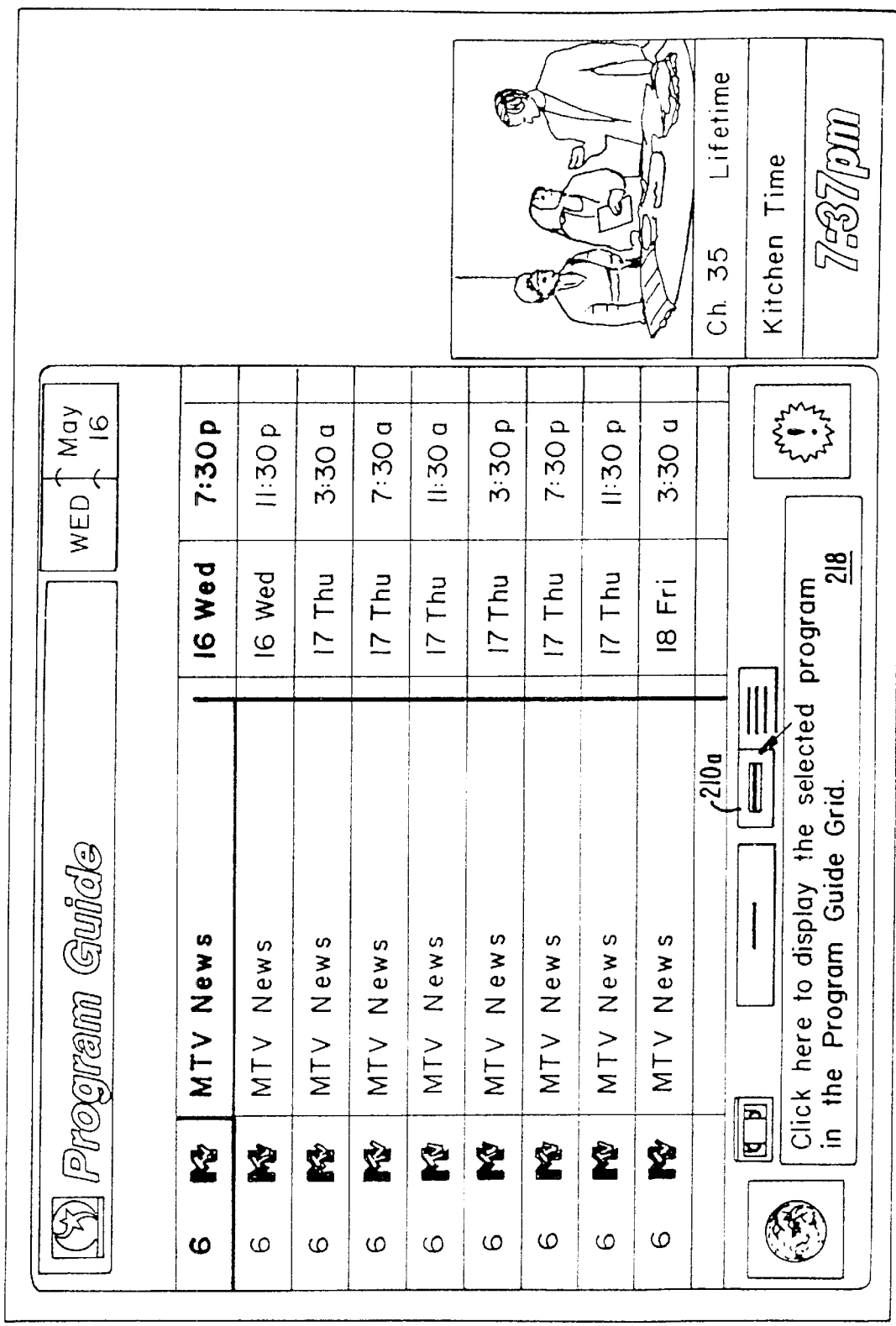

Referring to FIG. 17, the user has moved the pointer over the find others glyph 210 which again splits showing the two different display configurations. The pointer is over the left button 210a and the currently selected button is highlighted. The text in the contextual help window 219 informs the user that a click will display the selected program in the program display grid.

Description of Vertical Flip Glyph

Figure 18:
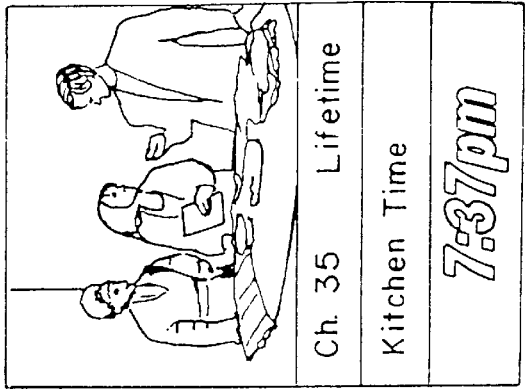
FIGS. 18–19 are representations of displays that implement the vertical/horizontal flip functions.

Referring to FIG. 18, when the user moves the pointer from the currently selected program and places it over the vertical flip glyph 211 the glyph immediately splits into a two-part recursive control button. The left button 211*a* symbolically suggests a horizontal display pattern and the left button 211*b* symbolically suggests a vertical display pattern. Note that the text in the constextual help window 218 tells the user what action to take and the results of the action.

Figure 19:
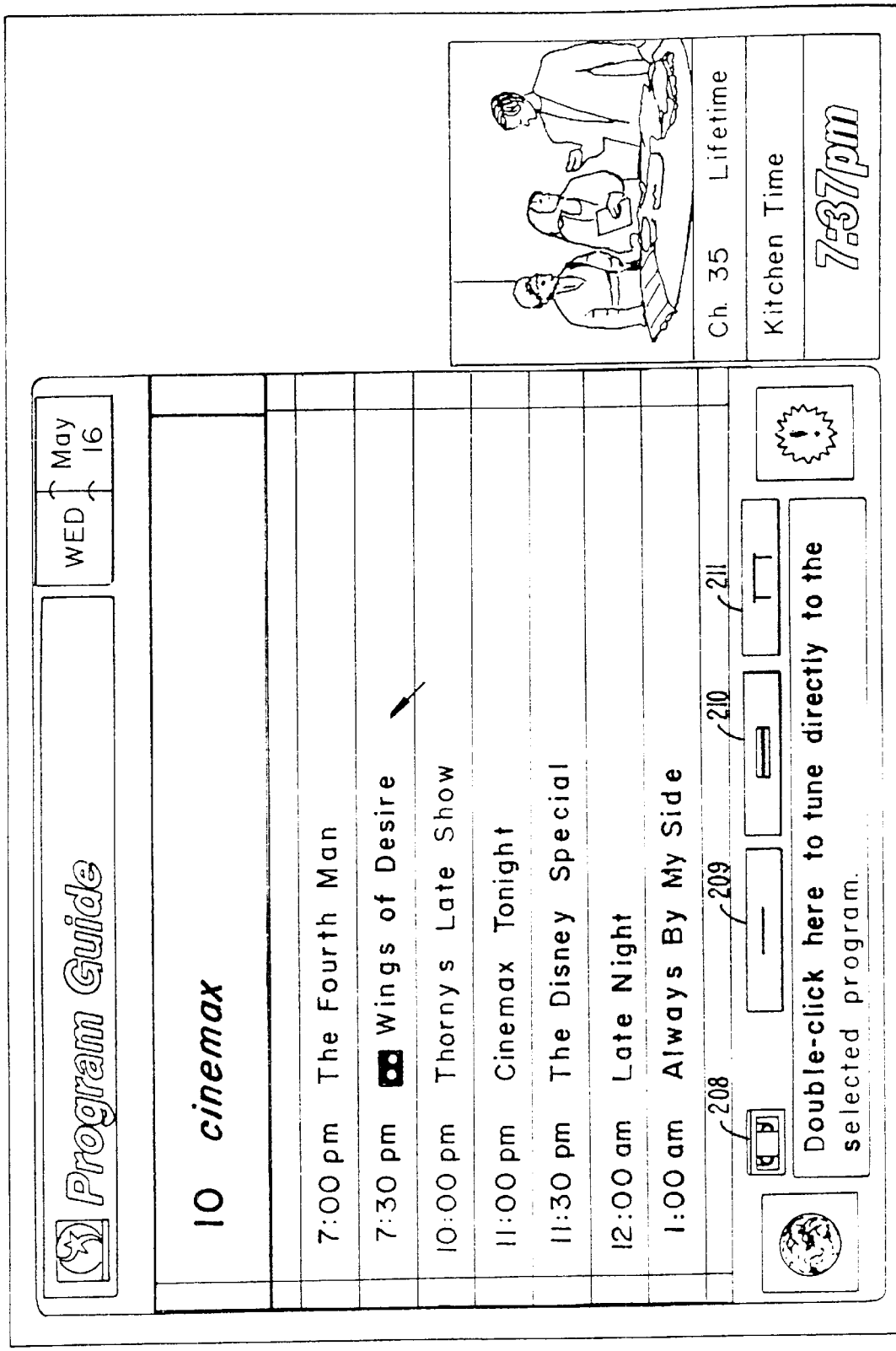

Referring to FIG. 19, as soon as the user completes the click a transitional animation (described below) occurs and the display area rotates clockwise so that the current channel item is stretched across the top with the programs that were laid out horizontally before now listed vertically below it. The text in the contextual help window 218 informs the user that double clicking in the area where the pointer is located will tune directly to the program. All the action control buttons 208–211 are displayed and are functional.

Description of Record Glyph

Figure 20:
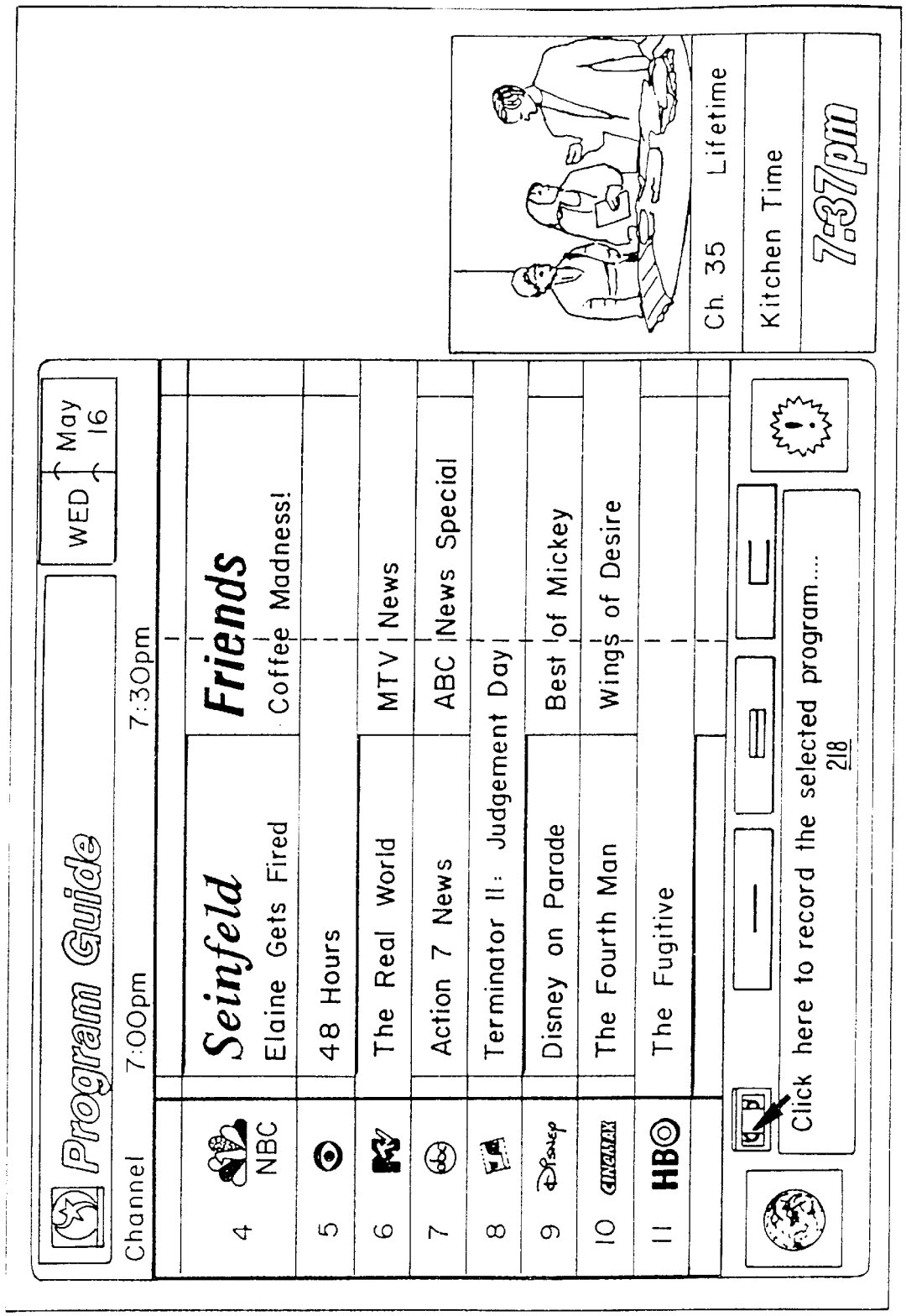

Referring to FIG. 20, when a user moves the pointer from the currently selected program and places the pointer over the recording glyph 208 the glyp is highlighted and the text in the contextual help window 218 tells the user what action to take and the results of the action.

Figure 21:
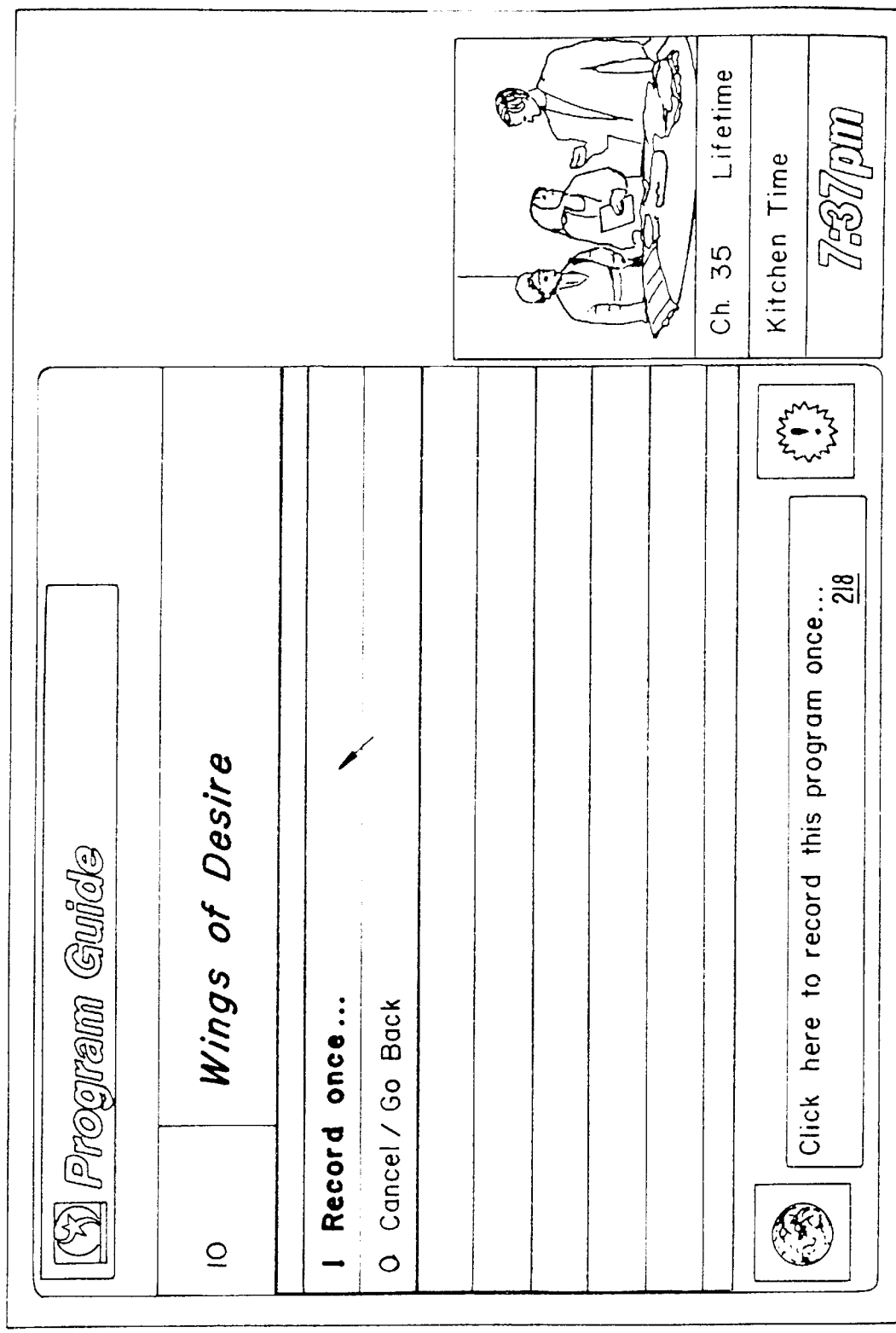

Referring to FIG. 21, when the user clicks on the recording glyph 208 an action menu appears. In the Figure, the pointer is placed over the "Record once . . . " entry which is highlighted. The text in the contextual help window 218 tells the user that clicking will record the program once. This is the only option that appears because record once is the only frequency available for this program. For other programs it may be appropriate to display "Record Daily", "Record Weekly", "Record entire miniseries . . . ", etc. The numbers that appear in the items are key-entry equivalents. For this reason, direct, keypad-entered tuning is disabled during functional sequences such as recording.

Figure 22:
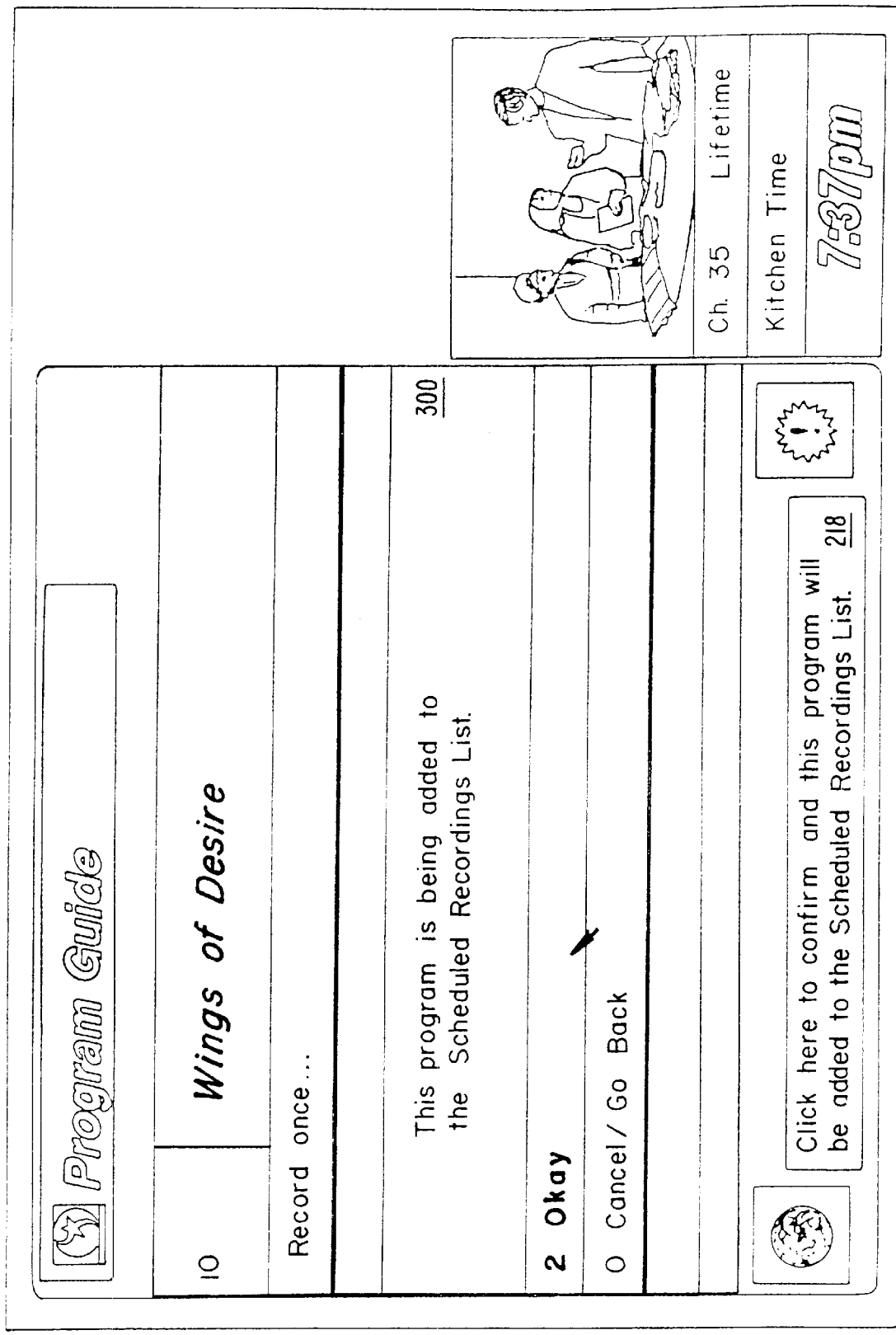

Referring to FIG. 22, when the user has clicked on the "Record once . . . " item a confirmation window 300 opens with text explaining the action about to be taken and with pointer placed over an "Okay" item which is highlighted. If the user clicks then the action described in the confirmation window will be completed. A "Cancel/Go Back" item is also displayed. If the user clicks here then the action described in the confirmation window 300 is not completed and the display returns to the form depicted in FIG. 23. Note that the function of the "Okay" item is described by the text displayed in contextual help window 218.

Note that the other display action controls have disappeared because the actions invoked by those controls are not appropriate in this context.

Figure 23:
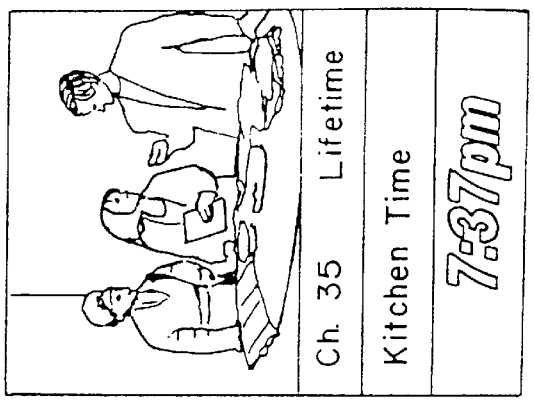

As depicted in FIG. 23, when the user returns from the recording scheduling sequence, a tape symbol 302 has been added to the program item. This symbol will appear on all instances of this program item wherever displayed as long as it is valid.

Figure 24:
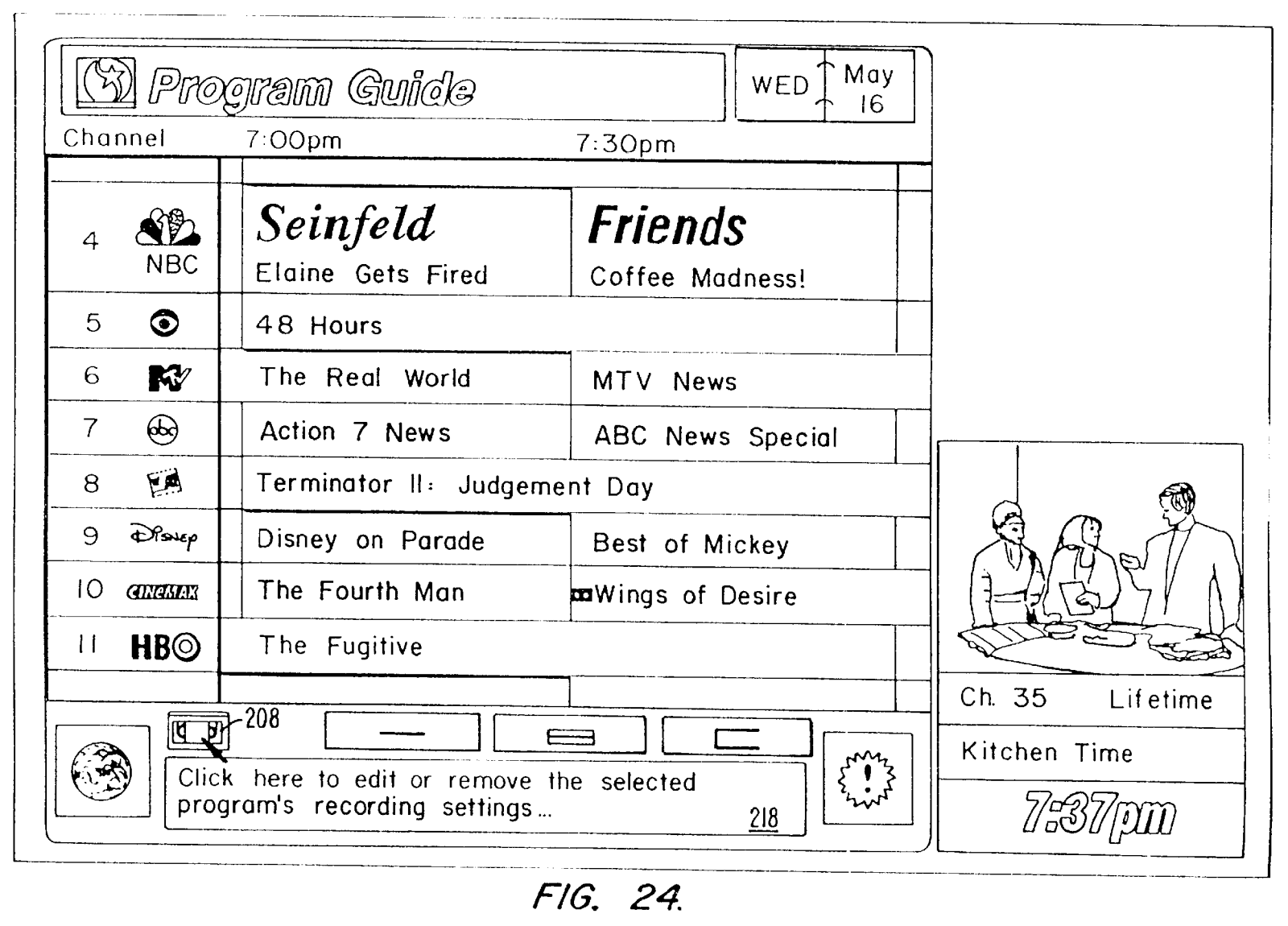

Referring to FIG. 24, when program displays the tape symbol and the user places the pointer over the recording glyph 208. Note that the text in the contextual help window 218 informs the user that the selected program's recording settings may be edited.

Figure 25:
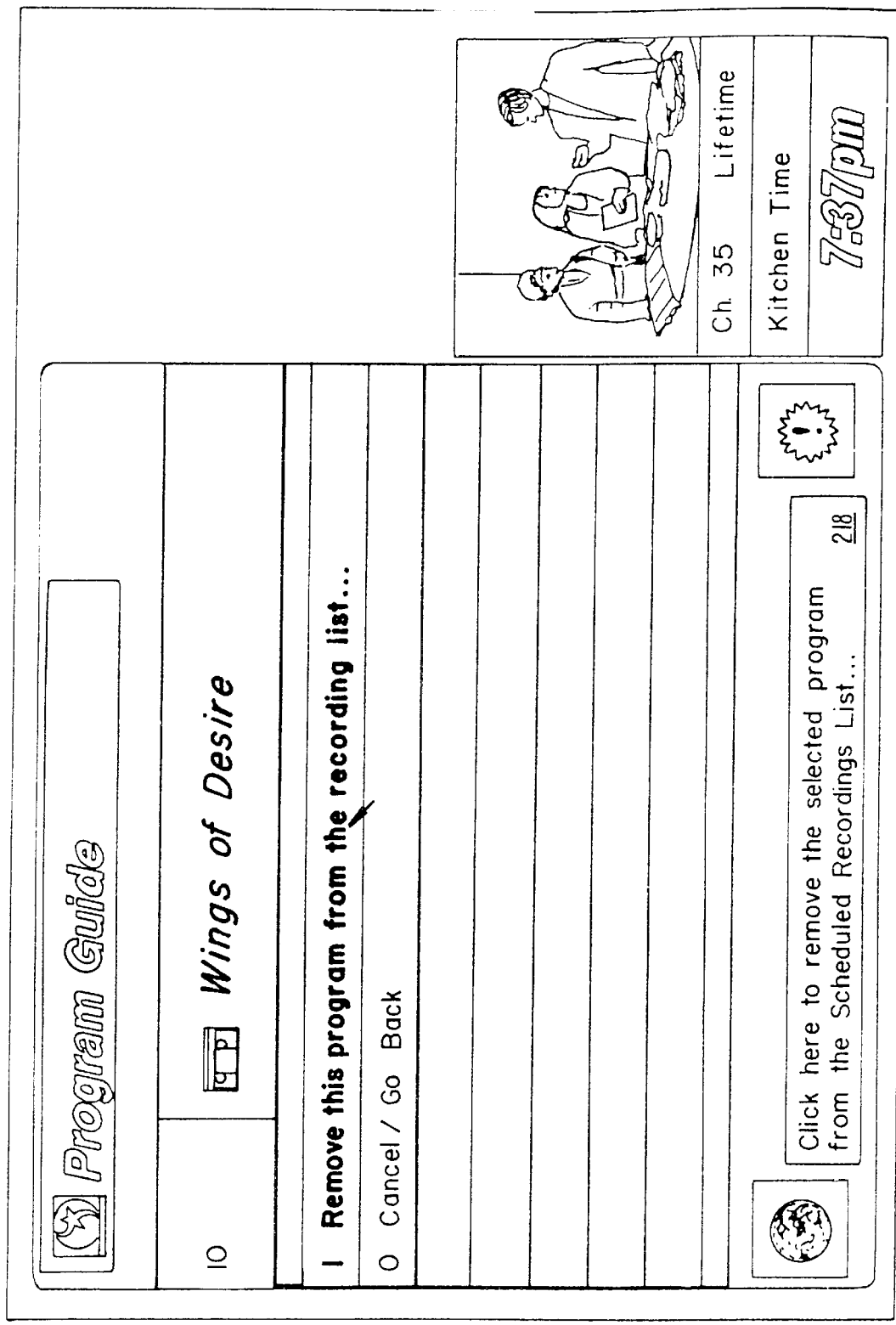

In FIG. 25, only those action items appropriate to the selected program, in this example "Remove this program from the recording list . . . ", are displayed. In other cases, such a program with multiple recording frequencies, the remaining settings would be accessible at this point, allowing the user additional changing options in addition to removing the program from the recording list. The "Cancel/Go Back" item always appears.

The video window 220 can be used for all types of promotional, descriptional, or contextual video or graphics, such as a short preview of the show that is currently being highlighted in show matrix 106. The video window 220 is also interactional similar to the other areas of guide 102.

In an exemplary configuration, the video window 220 displays the currently tuned program "live" so that the viewer can browse through program matrix 106 without missing the action on the currently tuned program. This feature allows the viewer, for example, to keep track of the score of a football game while browsing through the program matrix or performing other interactions with the system, such as purchasing goods or services, searching for more information on a program, etc. In another configuration, the viewer may set the video window to,change as the viewer browses through program matrix 106 so that the video window 220 depicts the highlighted program in the matrix. This allows the television viewer to quickly view each program without exiting from the program guide 102.

Figure 26:
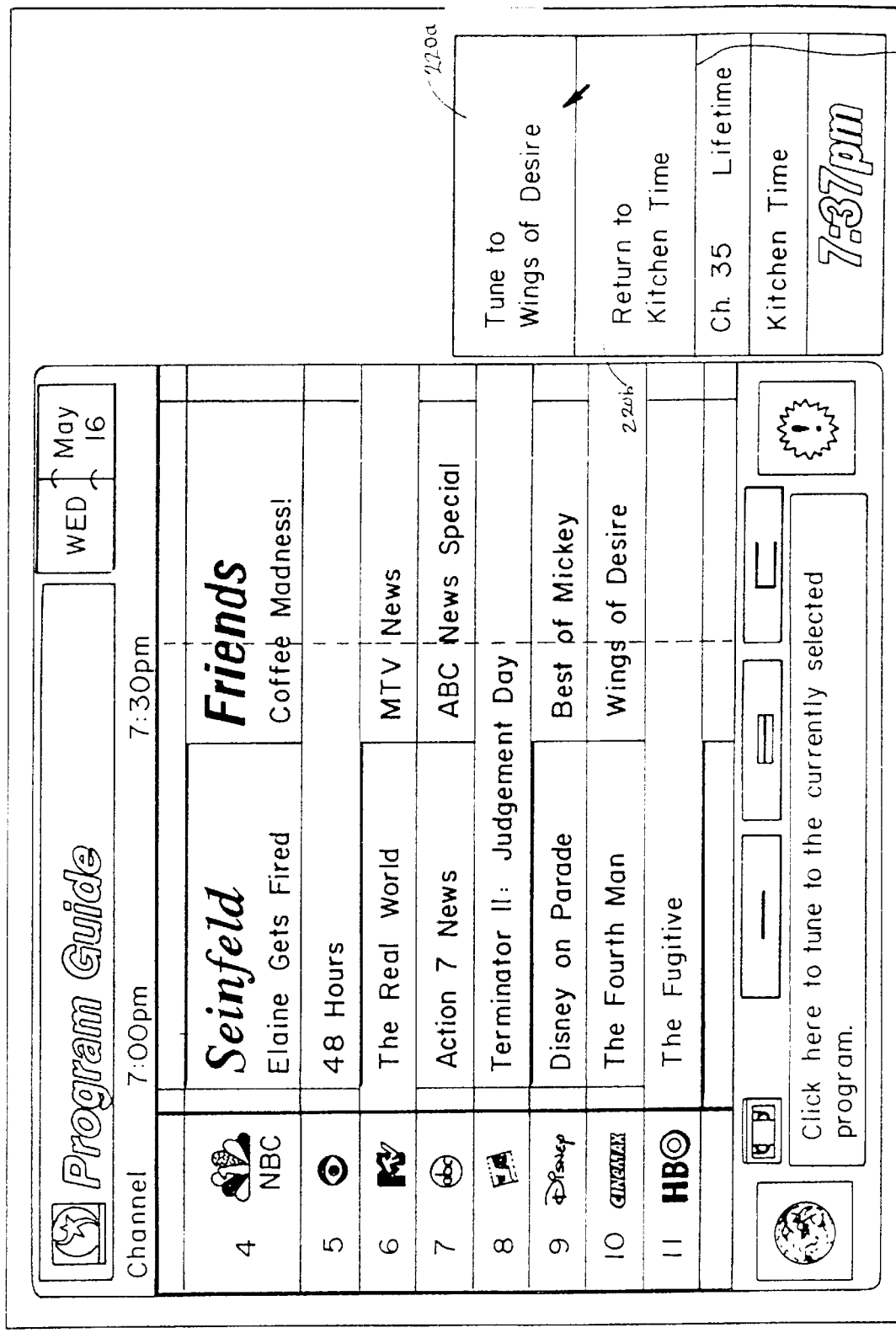
FIG. 26 is a representation of a display that implements the tuning function for the video window.

Referring to FIG. 26, the user has selected a program in the guide, i.e., Wings of Desire, and placed the pointer over the video window 220 . The video window is split into two interactive areas 220*a* and 220*b*. The top window 220*a* may be clicked to tune to the program selected in the guide or the bottom window 220*b* may be clicked to return to the currently-tuned program. The contextual help window 218 provides text to explain this split video window function.

A transitional animation storyboard is desplayed for the flip transition from the horizontal to vertical display. As is well-known computer animation is achieved by displaying a series of images which differ by a small amount. By transitionally animating the changing of the displays the viewer becomes more comfortable and familiar with the functional of the EPG.

Figure 27A:
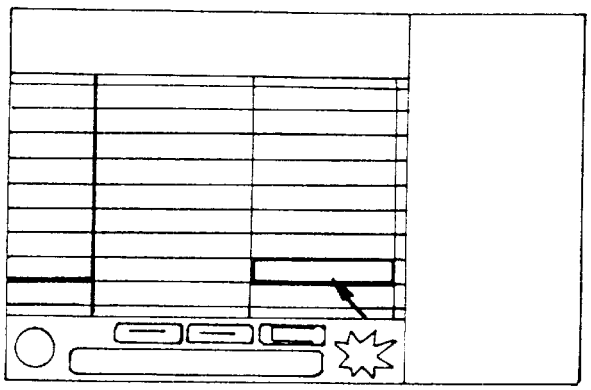
FIGS. 27A–27H are representations of displays for implementing a transitional animation function.

FIGS. 27A–27H show a flip activation sequence and an automated flip transitional metamorphosis. In FIG. 27A, the user has the cursor placed over the selected program item bar. To activate the flip button the user must leave the program item and navigate towards the lower right region of the icons panel in which the flip button is located.

Figure 27B:
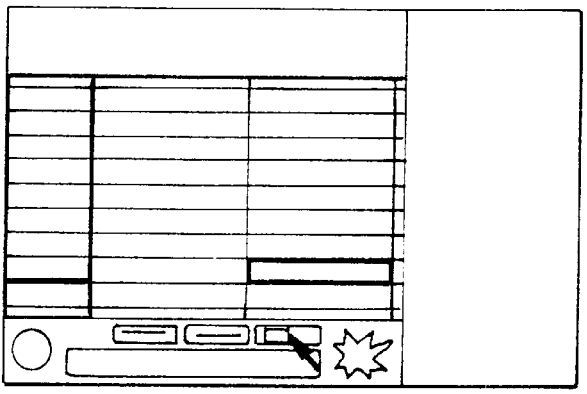

In FIG. 27B, the user has left the selected program item bar (indicated by the shaded, rendered bar in the lower right region of the program guide grid) selected, navigated to the flip icon and has placed the cursor over the flip-horizontal button. Immediately, the flip-horizontal and flip-vertical buttons appear and the flip-horizontal button is highlighted while the flip-vertical button is unselected.

Figure 27C:
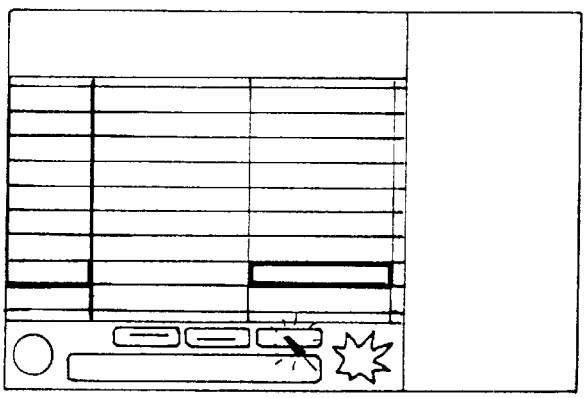

In FIG. 27C, the user has clicked once with the cursor over the flip buttons area. Once the flip buttons area is clicked on, the flip function is activated and the automated flip transitional metamorphosis begins.

Figure 27D:
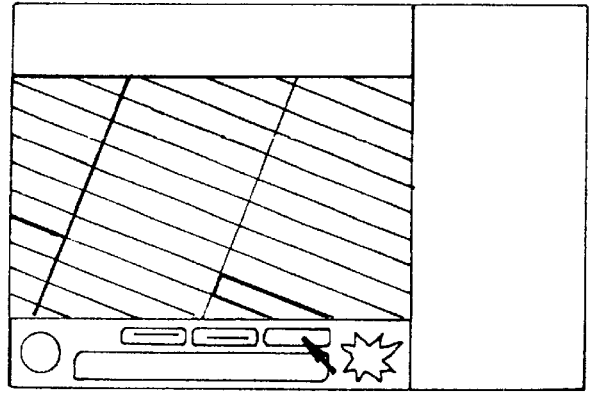

In FIG. 27D, the automated flip transitional metamorphosis has begun. The program guide grid has made a partial clockwise rotation.

Figure 27E:
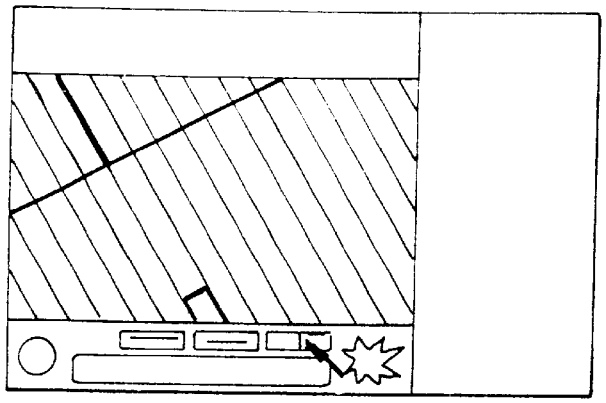

In FIG. 27E, the program guide grid has yet rotated even more in the same clockwise rotational direction.

Figure 27F:
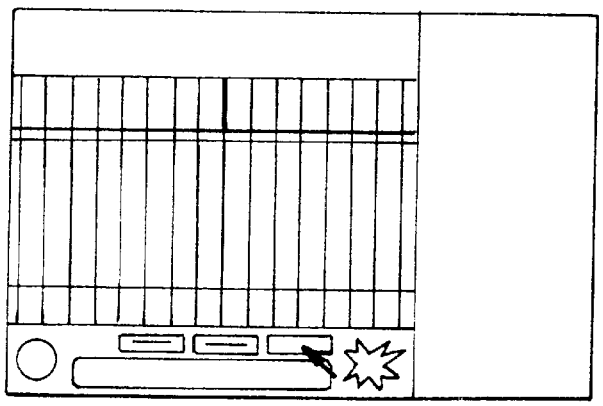

In FIG. 27F, the program guide grid has rotated ninety degrees clockwise, with its channel tractor bar height equivalent to its height in the flip-vertical configuration.

Figure 27G:
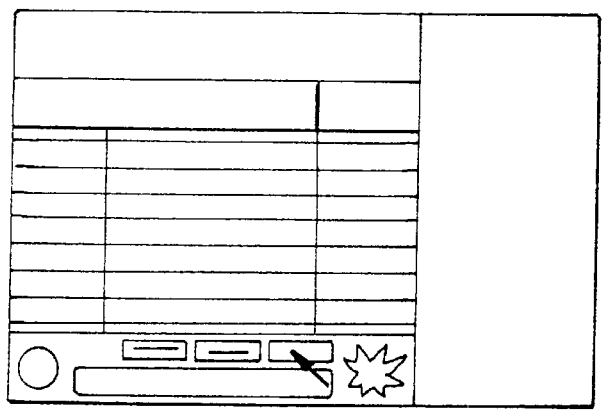

In FIG. 27G, both the channel tractor bar and the program item bar have begun to expand horizontally to their right and left sides, while their neighbors are also proportioned equivalently to either of them. The channel bars to the right and left of the selected channel tractor bar are proportioned the same as the selected channel tractor bar. The program item bars to the right and left of the selected program item bar are proportioned the same as the selected program item, bar. The program grid has been compressed vertically and stretched horizontally, to reconfigure itself to the eventual flip-vertical configuration.

Figure 27H:
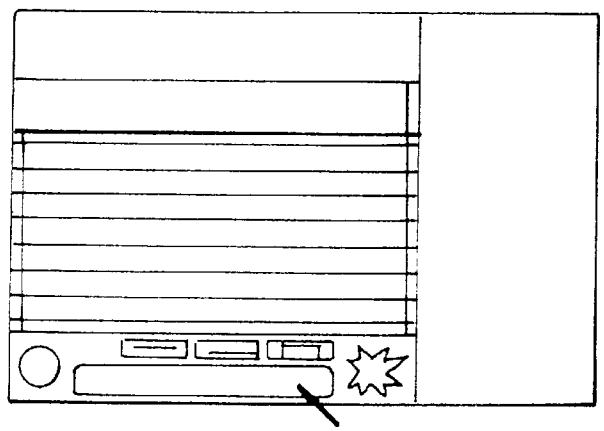

In FIG. 27H, the automated flip transitional metamorphosis ends. This is the program guide in its flip-vertical configuration. The user has moved the cursor out of the icons region to display the flip-vertical orientation. The text reappears and the programs are now configured in columnar fashion according to channel. The user is now free to navigate the program guide.

Interactivity of the Display Mode Title Area

Figure 28:
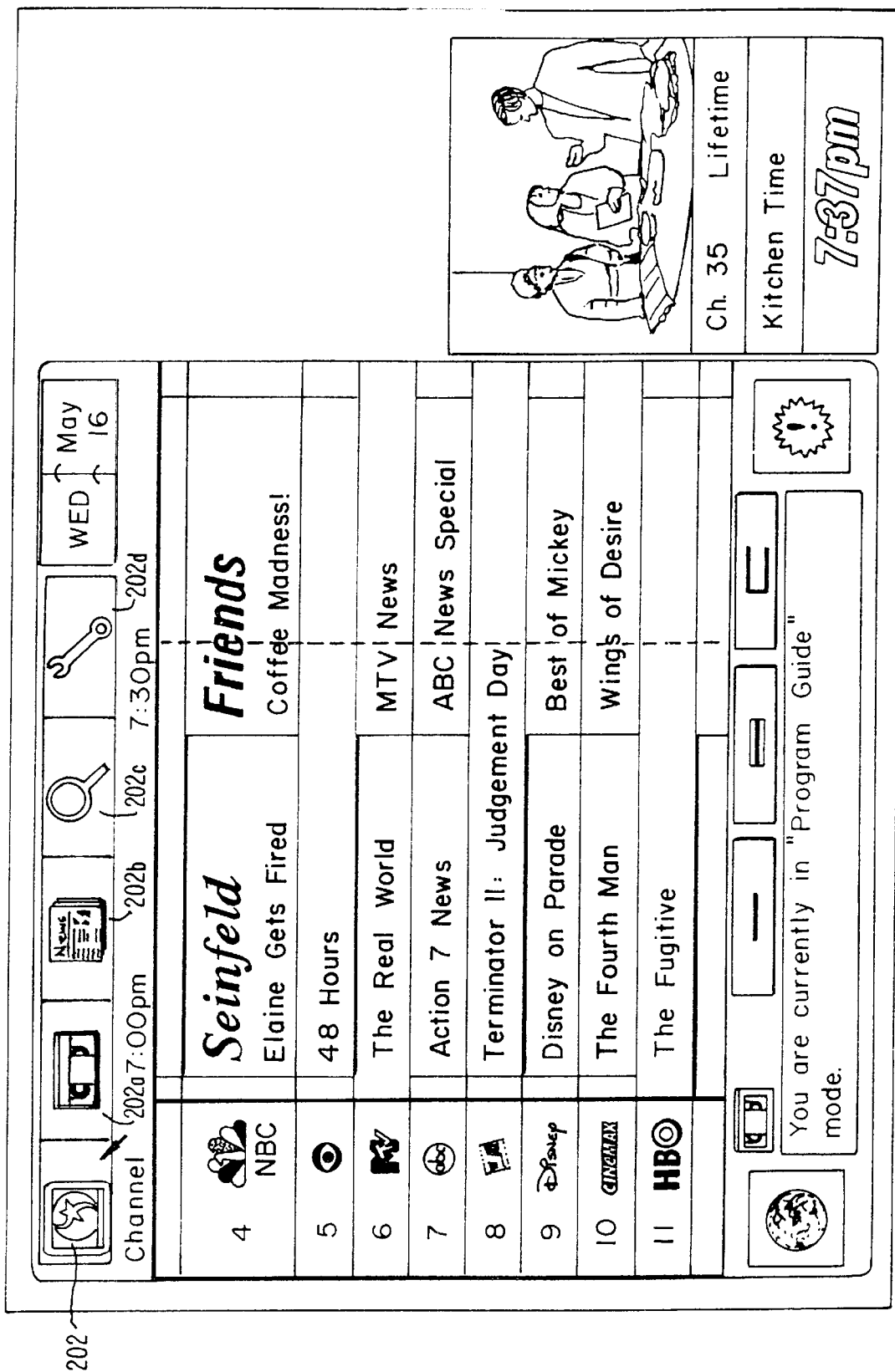
FIGS. 28 and 29 are representations of displays showing the interactive program mode area and icons.
Figure 29:
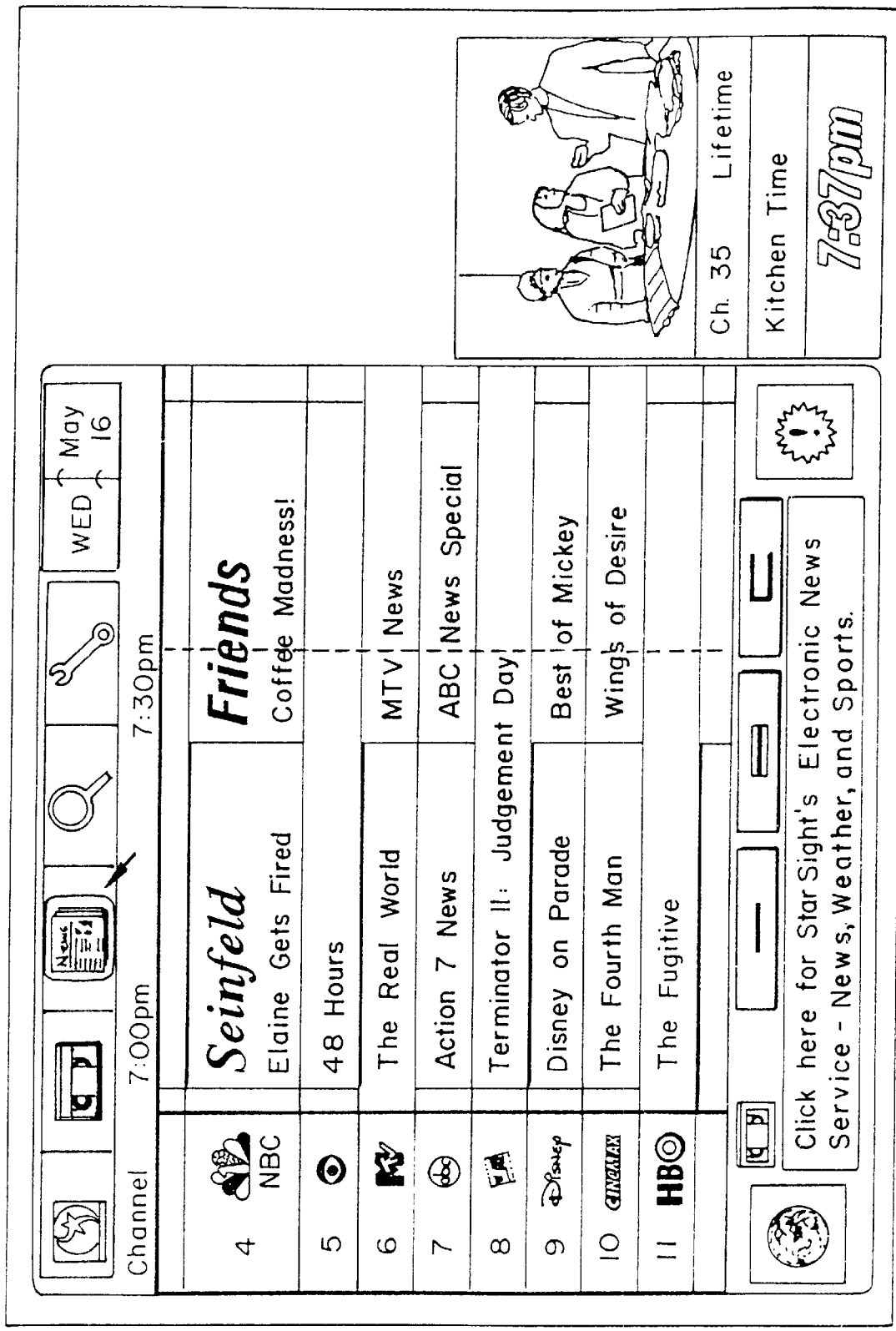

FIG. 28 illustrates that when the pointer is moved over the display title area 200 the display title area becomes an area of selectable icons 202a–d. The message in the contextual help window 218 indicates that the program guide is the current display mode. In FIG. 29 the pointer has moved over the Electronic News Service Icon 202b.

Function of Electronic News Service Icon

Figure 30:
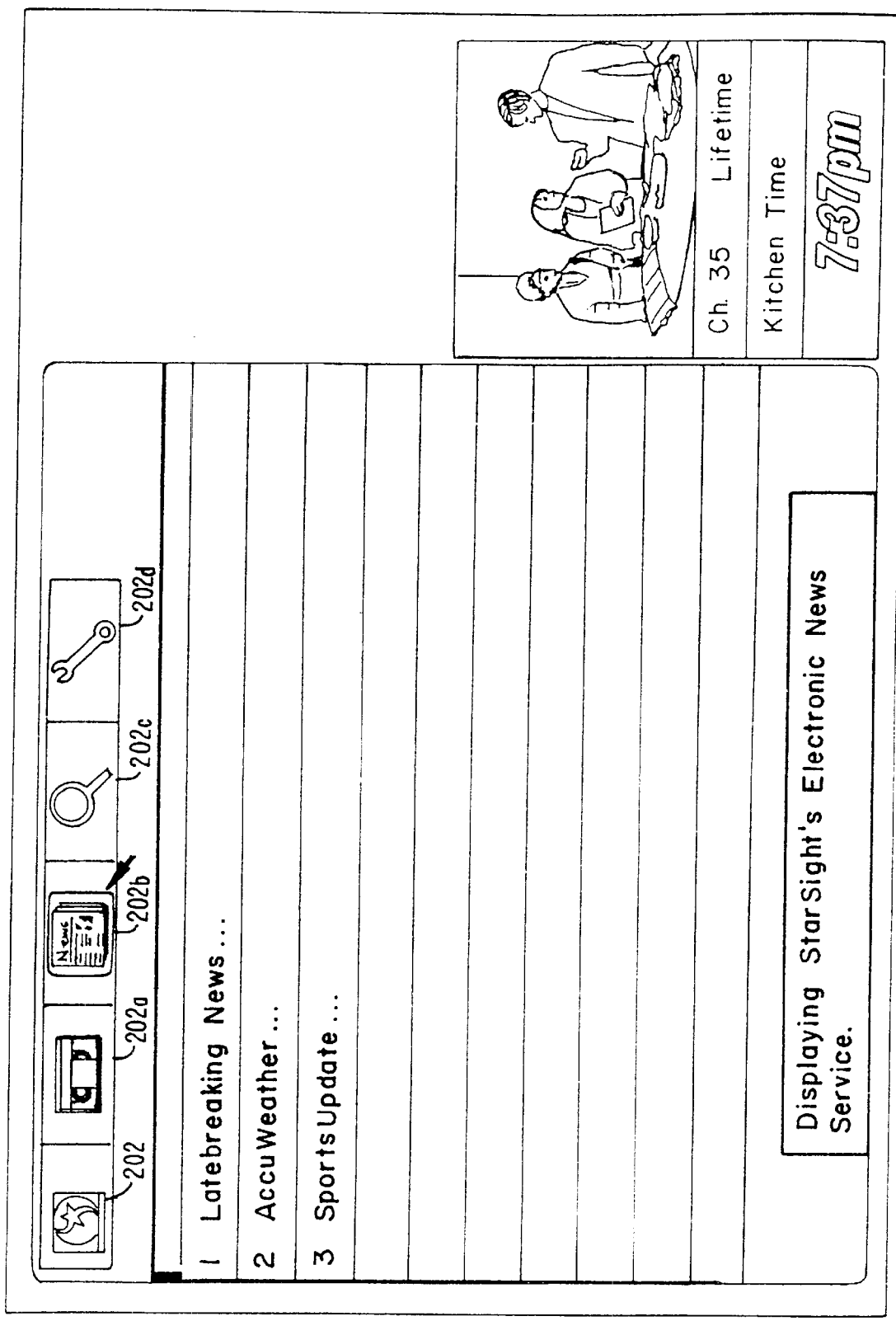
Figure 32:
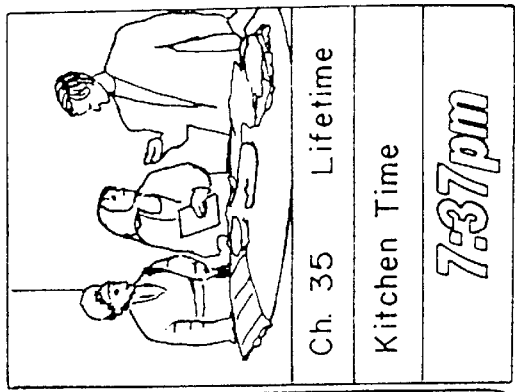
Figure 33:
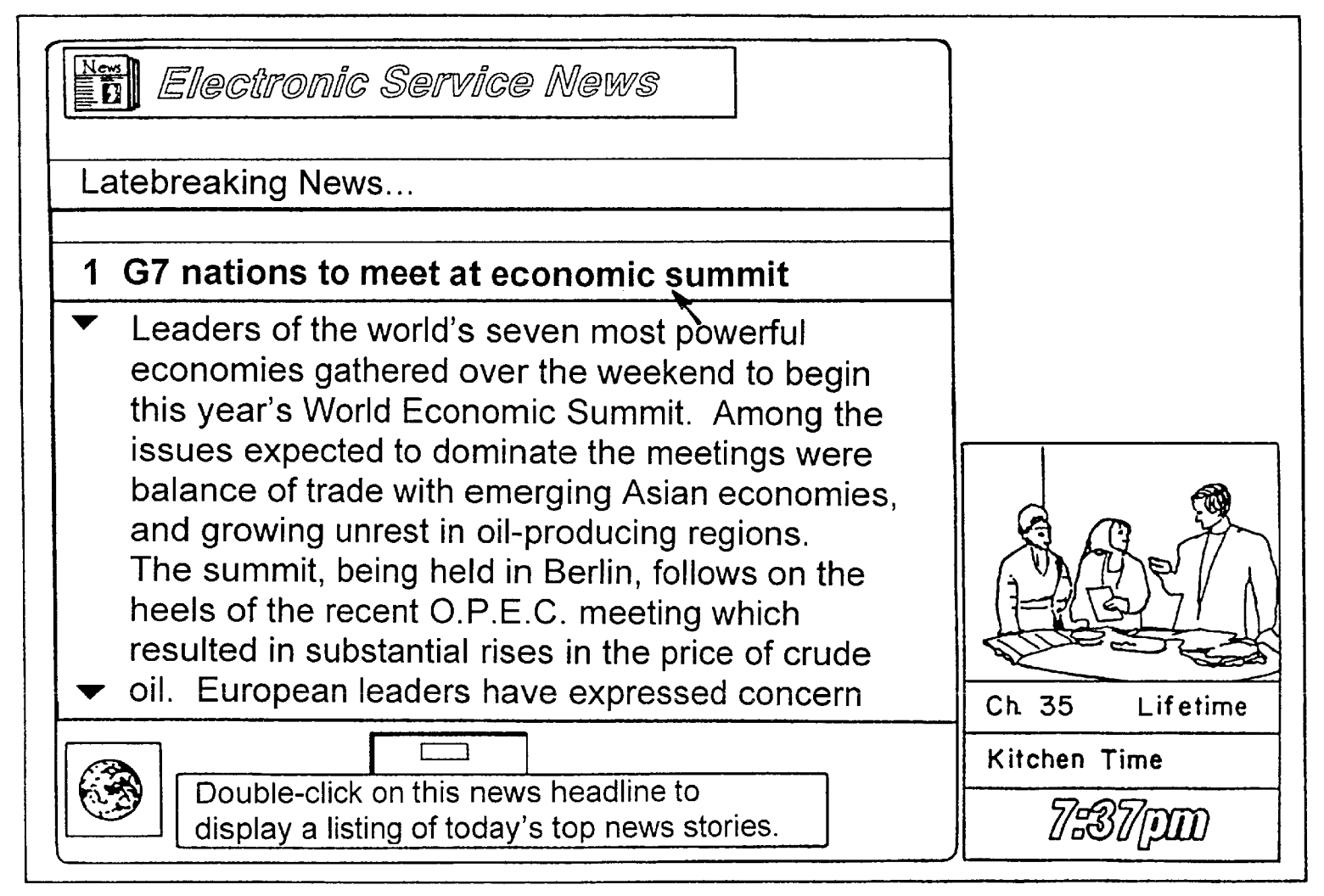

In FIG. 30, when the NEWS service icon 202b is selected a transition animation occurs and changes the display to a list of categorical choices. In FIG. 31, when the pointer is moved over the "1 Latebreaking News . . . " category the help text indicates the function to be performed by selecting this category. In FIG. 32, a list of latebreaking news items is displayed when the "Latebreaking News . . . " category is selected. In FIG. 33, just as in other contexts, the headline story is expanded into scrollable text. Note also that the info glyph has expanded into its recursive state.

The database includes a title table of story titles each including a pointer to an entry in a story description list including the detailed text of the story. The user interface responds to selection of interactive areas to display the story titles and descriptions when associated area are selected by the viewer.

What is claimed is:

1. An interactive EPG comprising:
    a display screen including interactive areas, a contextual help widow continuously displayed within the EPG and a pointer on the screen configured to invoke EPG functions;
    a display controller for processing display data for displaying on the display screen;
    a memory for storing EPG data including contextual help information about what action needs to be done;
    an input device for receiving commands; and
    a processor, coupled to the memory and the input device for displaying contextual help information about what action needs to be done in the continuously displayed contextual help window responsive to movement of the pointer over the interactive areas.

2. The EPG of claim 1, wherein the display data includes data for causing the display controller to display data including interactive areas in the forms of glyphs and where the stored data includes data for causing the display controller to recursively vary the configuration of the display when a viewer activates the glyphs.

3. The EPG of claim 1, wherein the stored data includes data for causing the display controller to display data including an interactive title mode area and wherein the stored data includes data for causing selectable display controlling icons to be displayed in the interactive title mode display area when the pointer is positioned over the interactive title mode area.

4. The EPG of claim 3, wherein a first display controlling icon is a program guide icon that, when selected, causes the display controller to display a program guide display.

5. The EPG of claim 3, wherein a second display controlling icon is a news services icon which, when selected, causes the display controller to display a list of new services.

6. An interactive electronic program guide (IPG) with contextual help capability displayed on a screen for facilitating interaction with the IPG comprising:
    a plurality of interactive areas within the IPG configured to invoke IPG actions;
    a contextual help window continuously displayed within the IPG for displaying contextual help information about what action needs to be done;
    a memory for storing IPG data including contextual help data;
    a display processor coupled to the memory for displaying the IPG data including the interactive areas and displaying the contextual help information about what action needs to be done on the continuously displayed contextual help window; and
    an on-screen cursor responsive to user commands for moving within the IPG for displaying a respective contextual data in the continuously displayed contextual help window.

7. The IPG of claim 6 wherein the contextual help data is text data informing a user of actions that can or need to be done.

8. The IPG of claim 6 wherein one of the plurality of interactive areas is a video window for displaying a currently-tuned television program.

9. The IPG of claim 6 wherein the input device is one or more of a keyboard, a remote controller, a pointer device, or a voice activated device.

10. The IPG of claim 6 wherein the plurality of interactive areas include means for recording a program or tuning to a television channel.

11. The IPG of claim 6 wherein the plurality of interactive areas include one or more of means for accessing a related Internet site, means for purchasing a pay-per-view channel, or means for purchasing merchandise.

12. A method for displaying on a screen an interactive electronic program guide (IPG) including a contextual help window and a plurality of interactive areas, the method comprising the steps of:
    storing IPG data including contextual help information about what action needs to be done associated with a respective interactive area;
    displaying the IPG on the screen in a guide format;
    continuously displaying the contextual help window within the IPG;
    responsive to a user command, moving a cursor to an interactive area; and
    displaying contextual help information about what action needs to be done associated with the interactive area in the continuously displayed contextual help window.

13. The method of claim 12 wherein the step of displaying contextual help data comprises displaying text data for informing a user of actions that can or need to be done.

14. The method of claim 12 wherein the step of displaying the IPG comprises displaying a video window for a currently-tuned television program.

15. The method of claim 12 further comprising selecting a television program from the IPG and recording the selected program when it is telecast.

16. The method of claim 12 further comprising selecting a television program from the IPG and tuning to the selected program when it is telecast.

17. The method of claim 12 further comprising accessing a related Internet site by activating an area in the IPG.

18. The method of claim 12 further comprising purchasing a pay-per-view channel.

19. A method for displaying on a screen an interactive electronic program guide (IPG) including a contextual help window and a plurality of interactive areas, the method comprising the steps of:

storing IPG data including contextual help information about what action needs to be done;

displaying the IPG on the screen;

continuously displaying the contextual help window within the IPG; and responsive to a user command, displaying contextual help information about what action needs to be done in the continuously displayed contextual help window.

20. The method of claim 19, wherein the step of displaying contextual help data comprises displaying text data for informing a user of actions that can or need to be done.

21. The method of claim 19, wherein the step of displaying the IPG comprises displaying a video window for a currently-tuned television program.

22. The method of claim 19, further comprising selecting a television program from the IPG and recording the selected program when it is telecast.

23. The method of claim 19, further comprising selecting a television program from the IPG and tuning to the selected program when it is telecast.

24. The method of claim 19, further comprising accessing a related Internet site by activating an area in the IPG.

25. The method of claim 19, further comprising displaying a confirmation of an action performed by a user in a text window.

26. The method of claim 19, further comprising the steps of automatically searching for other airings of a currently selected program and displaying a listing of the other airings of a currently selected program.

27. The method of claim 12, further comprising displaying a confirmation of an action performed by a user in a text window.

28. The method of claim 12, further comprising the steps of automatically searching for other airings of a currently selected program and displaying a listing of the other airings of a currently selected program.

29. The EPG of claim 2, wherein a first glyph is a find other glyph for automatically searching for and displaying a listing of other airings of a currently selected program.

* * * * *

UNITED STATES PATENT AND TRADEMARK OFFICE
CERTIFICATE OF CORRECTION

PATENT NO.   : 6,412,110 B1  Page 1 of 1
DATED        : June 25, 2002
INVENTOR(S)  : Steven Michael Schein et al.

It is certified that error appears in the above-identified patent and that said Letters Patent is hereby corrected as shown below:

<u>Column 15,</u>
Line 35, replace "widow" with -- window --.

Signed and Sealed this

Eighth Day of April, 2003

JAMES E. ROGAN
*Director of the United States Patent and Trademark Office*